(12) United States Patent
Jung et al.

(10) Patent No.: US 12,033,252 B2
(45) Date of Patent: Jul. 9, 2024

(54) ELECTRONIC DEVICE AND METHOD FOR CONTROLLING APPLICATION THEREOF

(71) Applicant: SAMSUNG ELECTRONICS CO., LTD., Suwon-si (KR)

(72) Inventors: Hanchul Jung, Suwon-si (KR); Jungyeob Oh, Suwon-si (KR); Hyeryoung Kim, Suwon-si (KR); Mogwon Son, Suwon-si (KR); Hyungmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 17/436,844

(22) PCT Filed: Mar. 9, 2020

(86) PCT No.: PCT/KR2020/003263
§ 371 (c)(1),
(2) Date: Sep. 7, 2021

(87) PCT Pub. No.: WO2020/180167
PCT Pub. Date: Sep. 10, 2020

(65) Prior Publication Data
US 2022/0180582 A1    Jun. 9, 2022

(30) Foreign Application Priority Data

Mar. 7, 2019  (KR) ........................ 10-2019-0026145

(51) Int. Cl.
*G06T 11/60*    (2006.01)
*G06F 3/04883*    (2022.01)
*H04M 1/72409*    (2021.01)

(52) U.S. Cl.
CPC .......... *G06T 11/60* (2013.01); *G06F 3/04883* (2013.01); *H04M 1/72409* (2021.01); *G06F 2203/04804* (2013.01); *G06T 2210/62* (2013.01)

(58) Field of Classification Search
None
See application file for complete search history.

(56) References Cited

U.S. PATENT DOCUMENTS 8,532,596 B1    9/2013  Park
8,774,869 B2    7/2014  Park
(Continued)

FOREIGN PATENT DOCUMENTS

EP         3 385 829        10/2018
KR    10-2009-0096743        9/2009
(Continued)

OTHER PUBLICATIONS

International Search Report for PCT/KR2020/003263 dated Jul. 6, 2020, 7 pages with English Translation.
(Continued)

*Primary Examiner* — Yi Wang
(74) *Attorney, Agent, or Firm* — Nixon & Vanderhye, P.C.

(57) ABSTRACT

The present disclosure provides a method of controlling an application of an electronic device, including displaying a memo screen of a memo application in a foreground in a translucent manner with the memo screen superimposed on a first execution screen of a content application being executed in a background, displaying the translucent memo screen including a first content included in the first execution screen based on a user input for selecting the first content, switching the first execution screen of the content application to a second execution screen of the content application, (Continued)

displaying the memo screen of the memo application in the foreground in a translucent manner with the memo screen superimposed on the second execution screen of the content application being executed in the background, and displaying the translucent memo screen including the first content and a second content included in the second execution screen based on a user input for selecting the second content.

12 Claims, 28 Drawing Sheets

(56) References Cited

U.S. PATENT DOCUMENTS

| | | |
|---|---|---|
| 9,110,587 B2 | 8/2015 | Kim et al. |
| 9,575,655 B2 | 2/2017 | Rytivaara |
| 9,594,479 B2 | 3/2017 | Oh et al. |
| 9,632,664 B2 | 4/2017 | Foss et al. |
| 9,804,898 B2 | 10/2017 | Han et al. |
| 9,898,186 B2 | 2/2018 | Kim et al. |
| 10,067,645 B2 | 9/2018 | King et al. |
| 10,152,216 B2 | 12/2018 | Kim |
| 10,180,772 B2 | 1/2019 | Foss et al. |
| 2008/0163082 A1 | 7/2008 | Rytivaara |
| 2013/0331152 A1 | 12/2013 | Park |
| 2014/0015776 A1 | 1/2014 | Kim et al. |
| 2014/0015780 A1 | 1/2014 | Kim et al. |
| 2014/0015782 A1 | 1/2014 | Kim et al. |
| 2014/0089947 A1 | 3/2014 | Han et al. |
| 2014/0253779 A1 | 9/2014 | Park |
| 2015/0046859 A1* | 2/2015 | Koo .................... G06F 3/04886 715/768 |
| 2015/0338945 A1* | 11/2015 | Masuda .............. G06F 3/04883 345/174 |
| 2016/0103504 A1* | 4/2016 | Kang .................. G06F 3/04162 345/173 |
| 2016/0180116 A1* | 6/2016 | Kim ........................ G09G 5/00 715/768 |
| 2016/0259527 A1 | 9/2016 | Kocienda et al. |
| 2016/0259528 A1 | 9/2016 | Foss et al. |

FOREIGN PATENT DOCUMENTS

| | | |
|---|---|---|
| KR | 10-1315957 | 10/2013 |
| KR | 10-2014-0008987 | 1/2014 |
| KR | 10-2014-0040379 | 4/2014 |
| KR | 10-2014-0092459 | 7/2014 |
| KR | 10-2014-0130854 | 11/2014 |
| KR | 10-2014-0142546 | 12/2014 |
| KR | 10-2015-0051771 | 5/2015 |
| KR | 10-2015-0080796 | 7/2015 |

OTHER PUBLICATIONS

Written Opinion of the ISA for PCT/KR2020/003263 dated Jul. 6, 2020, 9 pages with English Translation.
Office Action dated Apr. 19, 2024 in Korean Patent Application No. 10-2019-0026145 and English-language translation.

* cited by examiner

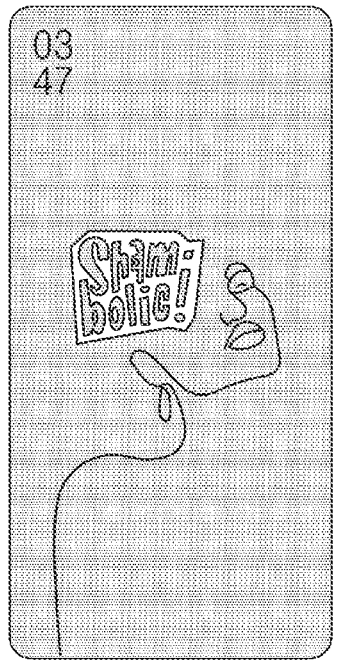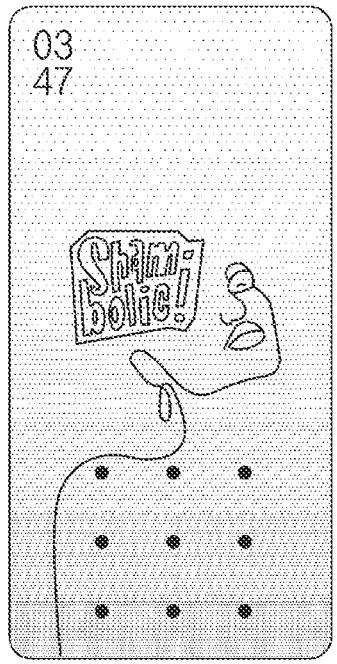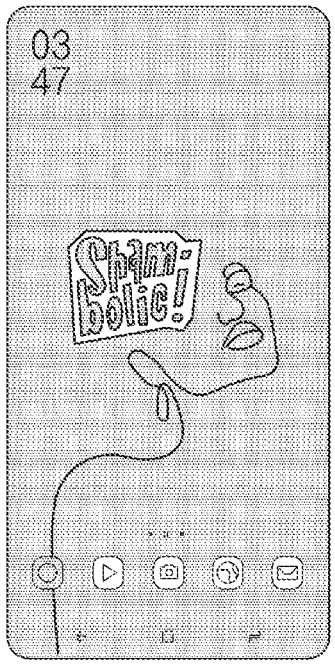
(6-e)  (6-f)  (6-g)
FIG.6C

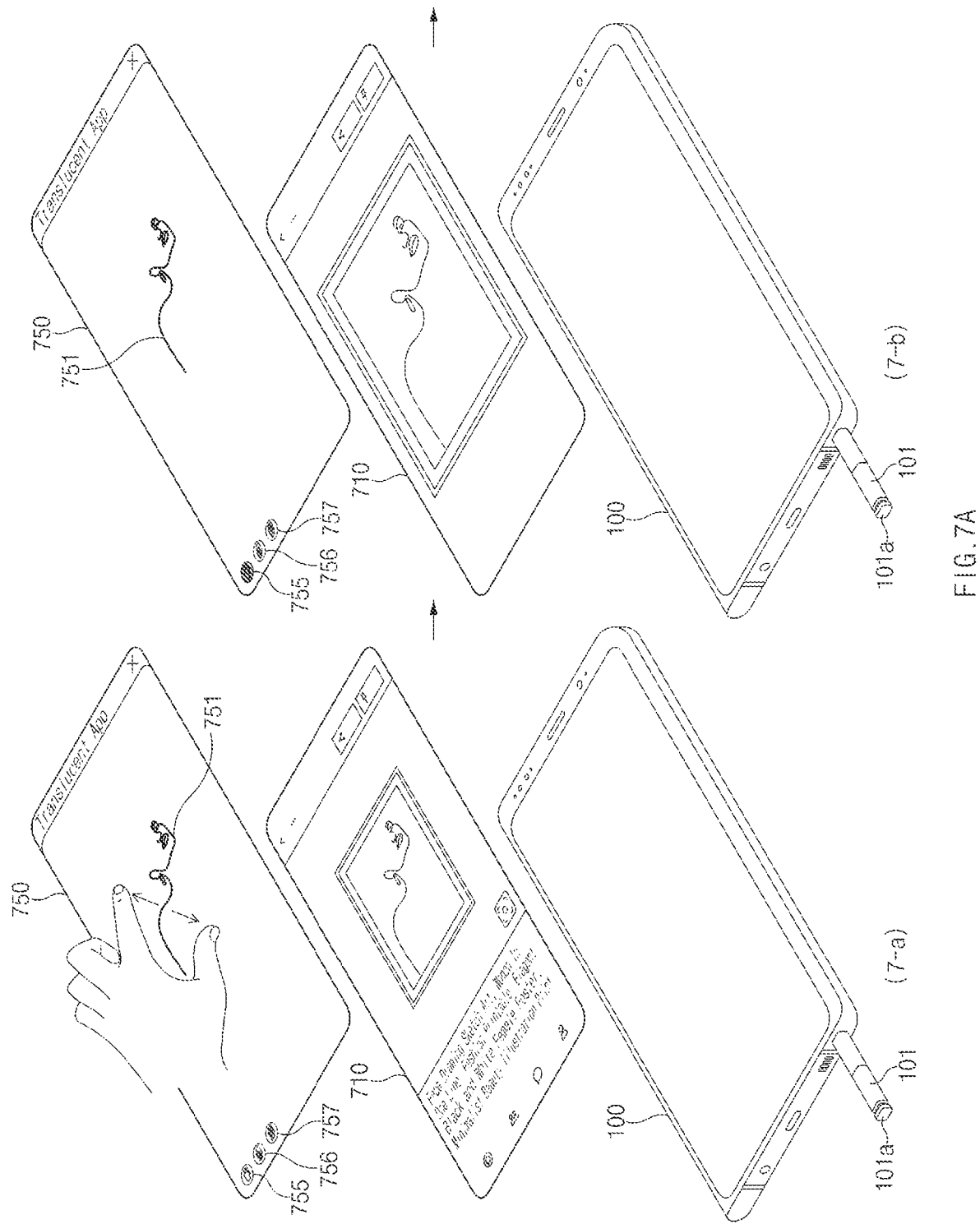

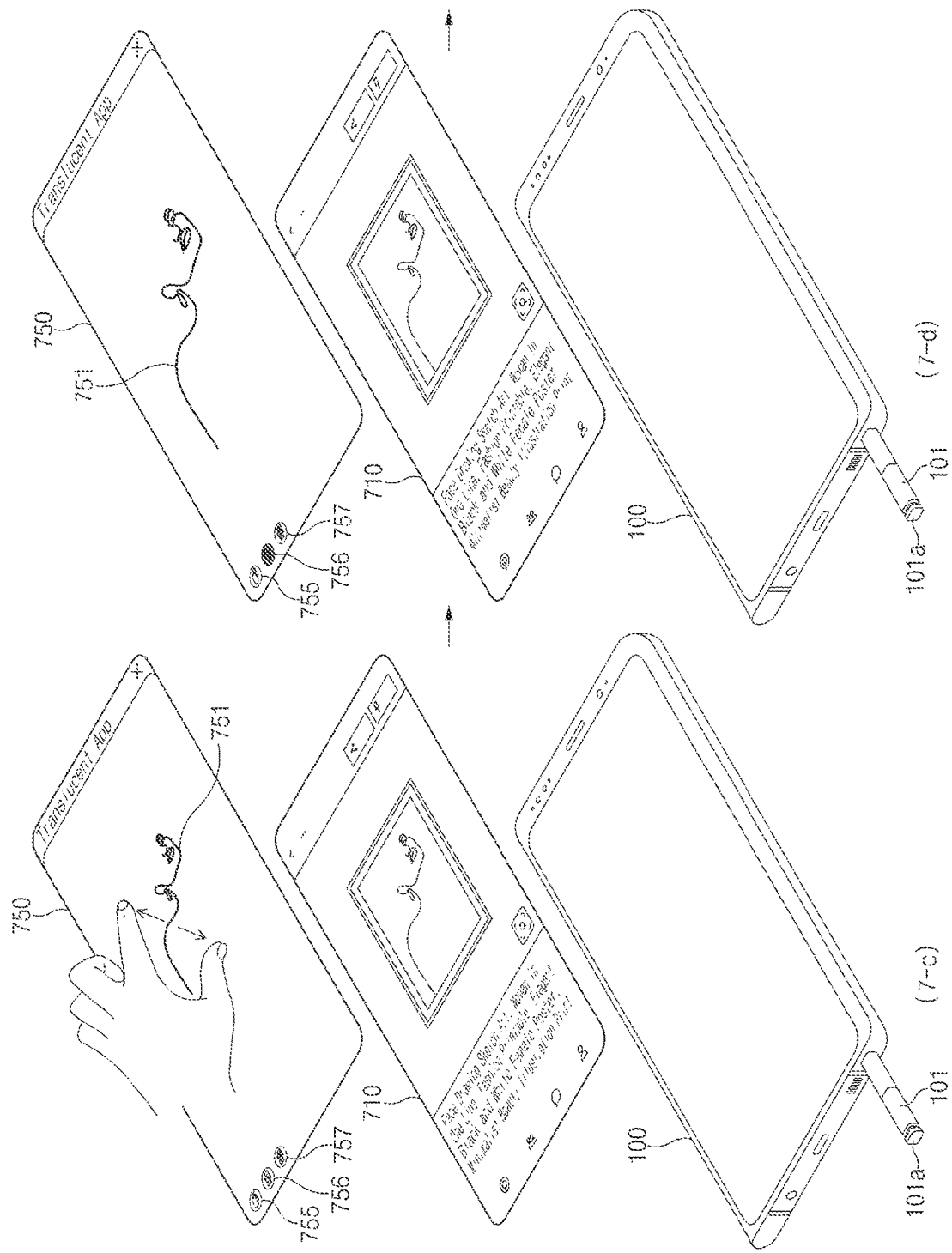

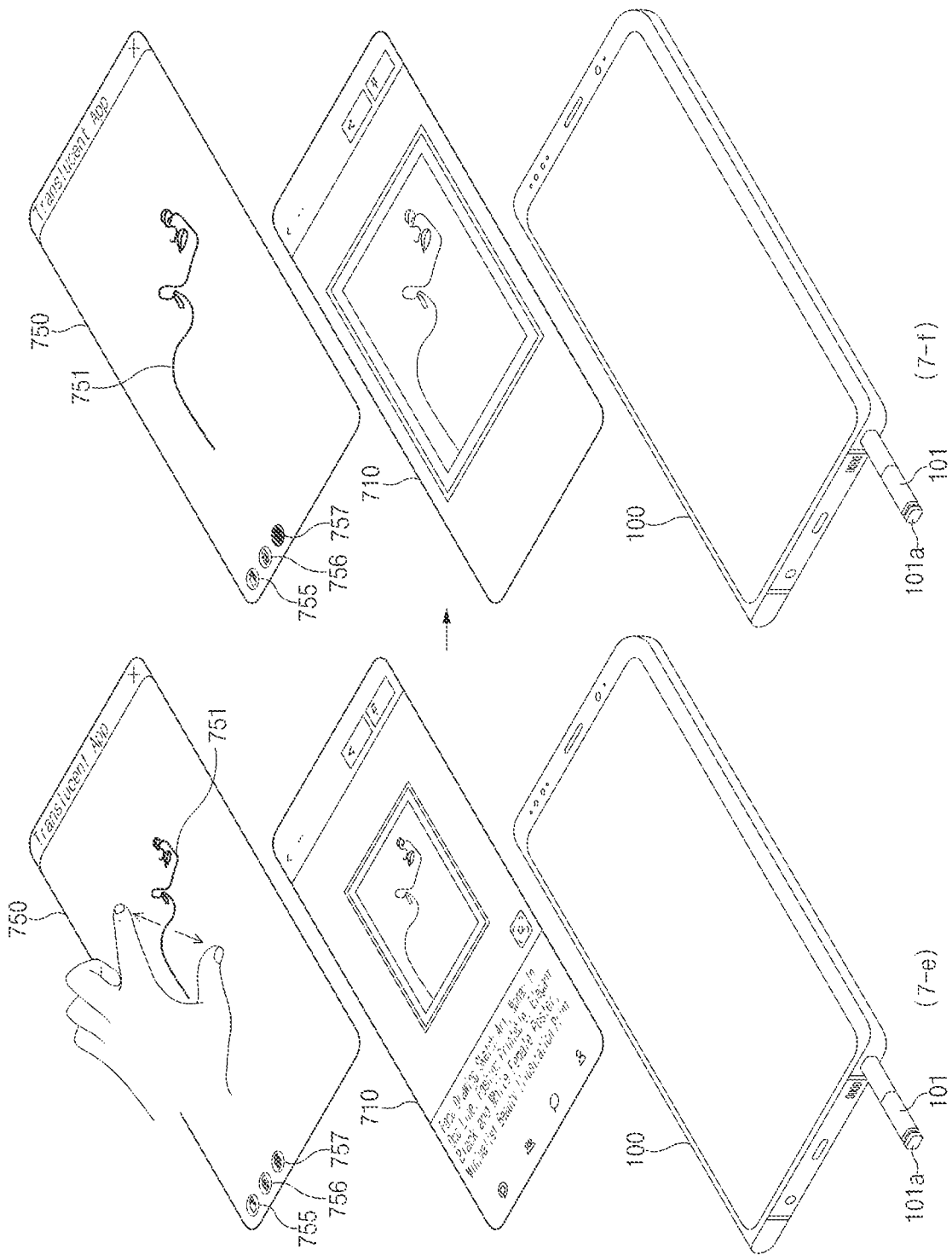

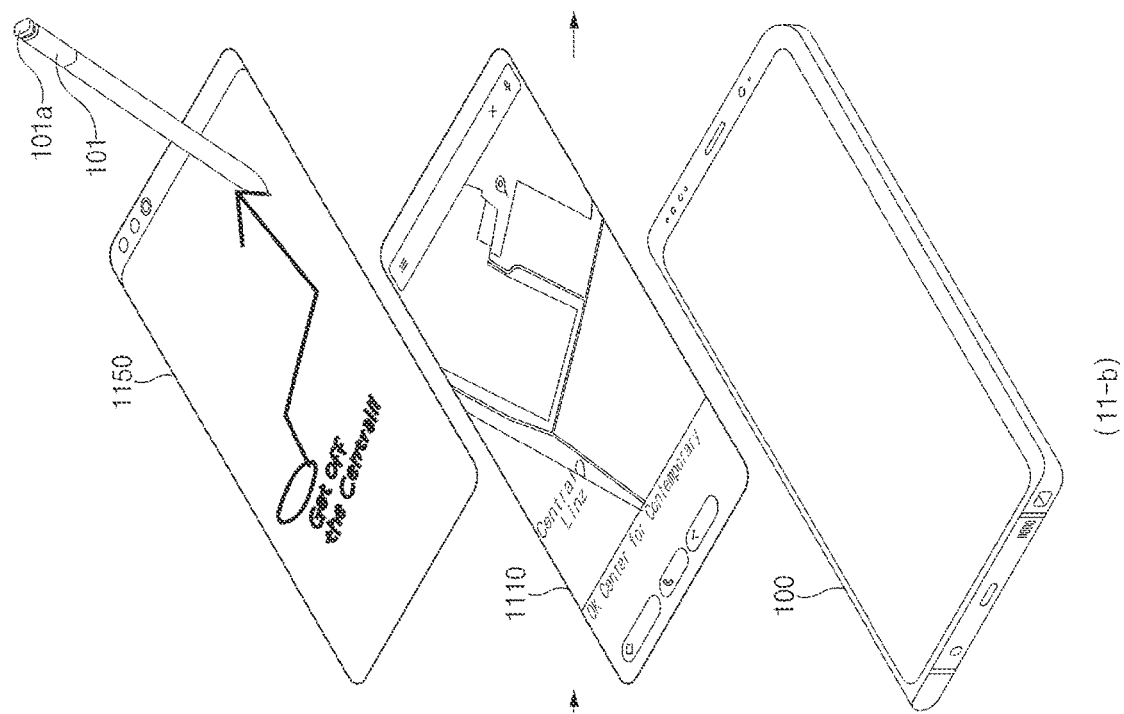
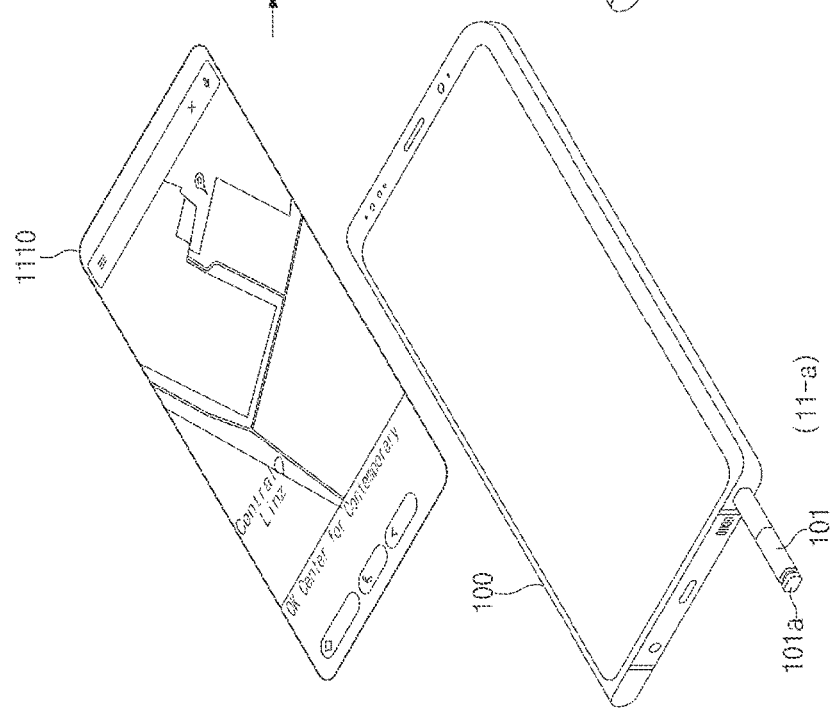
FIG. 11A

ELECTRONIC DEVICE AND METHOD FOR CONTROLLING APPLICATION THEREOF

This application is the U.S. national phase of International Application No. PCT/KR2020/003263 filed Mar. 9, 2020 which designated the U.S. and claims priority to KR Patent Application No. 10-2019-0026145 filed Mar. 7, 2019, the entire contents of each of which are hereby incorporated by reference.

TECHNICAL FIELD

The present disclosure relates to an electronic device and a method of controlling an application thereof, and more particularly, to a method of controlling an application providing a memo screen.

BACKGROUND ART

A user may install various applications on an electronic device (e.g., a smartphone) and use specific functions through the installed applications.

Among them, there may be a memo application that provides a memo screen for a user to take a memo. For example, the memo application may be automatically executed and displayed on a screen when the user separates an electronic pen from the electronic device. The user may perform various types of input via the memo application. For example, the user may perform an operation, such as handwriting input or drawing, on the memo screen.

As one example, the user may come up with a good idea while searching for a screen of a specific content application. In this case, the user may separate the electronic pen from the electronic device to execute the memo application, and may perform handwriting input related to the idea on the memo screen provided by the memo application.

DISCLOSURE OF THE INVENTION

Technical Problem

When the user uses the memo application, the user needs to execute the memo application repeatedly whenever necessary. For example, in a situation in which the user takes a memo about one or more content applications, the user may take the memo related to content while alternately switching screens between the content application and the memo application. In this case, the complexity of the electronic device may increase due to frequent screen switching. In addition, the convenience of the user using the memo application may be degraded.

Accordingly, the present disclosure may include a method for increasing usability of a memo application and quickly switching screens between a content application and a memo application, and an electronic device for providing the same. In addition, the present disclosure may include a method for quickly copying content included in a plurality of screens provided by a content application to a memo screen, and easily checking the content copied to an existing memo screen, and an electronic device for providing the same.

Technical Solution

In order to achieve the above-mentioned objects, according to an aspect of the present disclosure, there is provided a method of controlling an application of an electronic device, the method including: displaying a memo screen of a memo application in a foreground in a translucent manner with the memo screen superimposed on a first execution screen of a content application being executed in a background; displaying the translucent memo screen including a first content included in the first execution screen based on a user input for selecting the first content; switching the first execution screen of the content application to a second execution screen of the content application; displaying the memo screen of the memo application in the foreground in a translucent manner with the memo screen superimposed on the second execution screen of the content application being executed in the background; and displaying the translucent memo screen including the first content and a second content included in the second execution screen based on a user input for selecting the second content.

According to another aspect of the present disclosure, there is provided an electronic device including: a touch screen; a memory that stores at least one instruction; and at least one processor operatively coupled to the touch screen and the memory, in which the memory includes at least one instruction configured to, when executed, cause the at least one processor to: control the touch screen to display a memo screen of a memo application in a foreground in a translucent manner with the memo screen superimposed on a first execution screen of a content application being executed in a background; control the touch screen to display the translucent memo screen including a first content included in the first execution screen based on a user input for selecting the first content through the touch screen; control the touch screen to switch the first execution screen of the content application to a second execution screen of the content application for displaying the second execution screen; control the touch screen to display the memo screen of the memo application in the foreground in a translucent manner with the memo application superimposed on the second execution screen of the content application being executed in the background; and control the touch screen to display the translucent memo screen including the first content and a second content included in the second execution screen based on a user input for selecting the second content.

According to another aspect of the present disclosure, there is provided a program product including at least one instruction configured to cause an electronic device to perform operations including: controlling the touch screen to display a memo screen of a memo application in a foreground in a translucent manner with the memo screen superimposed on a first execution screen of a content application being executed in a background; controlling the touch screen to display the translucent memo screen including a first content included in the first execution screen based on a user input for selecting the first content through the touch screen; controlling the touch screen to switch the first execution screen of the content application to a second execution screen of the content application for displaying the second execution screen; controlling the touch screen to display the memo screen of the memo application in the foreground in a translucent manner with the memo screen superimposed on the second execution screen of the content application being executed in the background; and controlling the touch screen to display the translucent memo screen including the first content and a second content included in the second execution screen based on a user input for selecting the second content.

Advantageous Effects

As described above, according to an embodiment of the present disclosure, it is possible to easily collect a work source (e.g., content, and the like) from a plurality of screens provided by the content application, and perform drawing work or make a copy to a memo screen with reference to the work source. In addition, it may be possible to perform complex functions, such as editing, saving, and sharing, on the content displayed on the memo screen.

In addition, it is possible to quickly switch between the content application being executed in the background and the memo application being executed in the foreground, and thus it is possible to minimize the complexity of the electronic device.

In addition, through the translucent memo application, it is possible to switch the screen of the content application being executed in the background while referring to the content displayed on the memo screen, and thus it is possible to greatly improve the user's convenience.

Besides, various effects may be provided that are directly or indirectly identified through the present disclosure.

BRIEF DESCRIPTION OF THE DRAWINGS

FIG. 6C is a diagram illustrating the process of controlling an application according to the other embodiment of the present disclosure.

FIG. 7A is a diagram illustrating a process of enlarging a screen provided by an application according to an embodiment of the present disclosure.

FIG. 7B is a diagram illustrating the process of enlarging a screen provided by an application according to the embodiment of the present disclosure.

FIG. 7C is a diagram illustrating the process of enlarging a screen provided by an application according to the embodiment of the present disclosure.

FIG. 11A is a diagram illustrating a process of sharing content according to an embodiment of the present disclosure.

MODE FOR CARRYING OUT THE INVENTION

Figure 1:
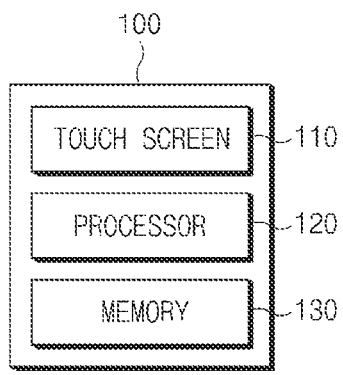
FIG. 1 is a diagram illustrating a block diagram of an electronic device according to an embodiment of the present disclosure.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

FIG. 1 is a diagram illustrating a block diagram of an electronic device according to an embodiment of the present disclosure.

In FIG. 1, the electronic device 100 may include a touch screen 110, a processor 120, and a memory 130.

The electronic device 100 may be a device of various types. The electronic devices may include, for example, a portable communication device (e.g., a smartphone), a computer device, a portable multimedia device, a portable medical device, a camera, a wearable device, or a home appliance. The electronic device according to an embodiment of the present disclosure is not limited to those described above.

The touch screen 110 may perform an input function and a display function. To this end, the touch screen 110 may include a display panel and a touch panel.

The display panel displays information input by the user or information to be provided to the user, including various menus of the electronic device. For example, the display panel may provide various screens according to the use of the electronic device, such as a home screen, a message writing screen, an incoming and/or outgoing text message display screen, a web page screen, a call screen, and the like. Such a display panel may be formed of a liquid crystal display (LCD), an organic light-emitting diode (OLED), an active matrix organic light-emitting diode (AMOLED), or the like.

In particular, the display panel according to the present disclosure may superimpose and display a memo screen of a memo application in a background in a state in which an execution screen of a content application is output in a foreground. In this case, the display panel may display the memo screen of the memo application with opaque, translucent, or predetermined transparency.

Various screens displayed on the display panel will be described later with reference to FIGS. 2 to 13b.

The touch panel may be stacked with the display panel, and may generate input data for a user input when a user's finger, an electronic pen, or the like comes into contact with or close to the touch panel, and transmit the input data to the processor 120. Specifically, the touch panel may recognize a touch event through a change in a physical quantity (e.g., capacitance, resistance, or the like) by contact or proximity to a touch input device, and transmit the type of touch event and touch location information to the processor 120 as the input data. The type of touch may include a tap event in which a touch is performed and then released without movement of the touch, a double touch event in which the tap event occurs twice within a certain period of time, a long touch event in which a touch is maintained for a certain period of time or more, a multi-touch event in which a touch occurs at least two points, and a touch movement event in which a touch is performed and then moves to change the position. In addition, the touch movement event may include a scroll event that moves linearly in a specific direction after a touch, and a gesture event that moves a touch to have a predefined shape (e.g., a circle, a triangle, or the like) after the touch. The above-mentioned touch panel is obvious to those of ordinary skill in the technical field of the present disclosure, and a detailed description thereof will be omitted.

In particular, while the memo screen of the memo application is displayed in the foreground, the touch panel according to the present disclosure may detect a user input such as a touch event and a touch gesture, and transmit, to the processor 120, input data for the user input.

The memory 130 may store various software programs (or applications) to be operated by the electronic device 100, and data and instructions for operating the electronic device 100. At least some of the programs may be downloaded from an external server through wireless or wired communication. The memory 130 is accessed by the processor 120, and the processor 120 may read/write/modify/delete/update software programs, data, and instructions included in the memory 130.

For example, the memory 130 may store a program for controlling the overall operation of the electronic device and an operating system (OS) for booting the electronic device, application programs required for other functions of the electronic device, such as camera functions, image or video playback functions, short-range wireless communication function, and the like, and incoming text messages or outgoing text messages. Further, the memory 130 may store a key map or a menu map for operating the touch screen 110. Here, each of the key map and the menu map may be formed in various manners. For example, the key map may be a keyboard map, a 3*4 key map, a QWERTY key map, or the like, or may be a control key map for operation control of a currently activated application program. Further, the menu map may be a menu map for controlling the operation of a currently activated application program.

Specifically, the memory 130 may include at least one instruction configured to, when executed, cause the at least one processor 120 to control the touch screen 110 to display the memo screen of the memo application in a foreground in a translucent manner with the memo screen superimposed on a first execution screen of the content application being executed in a background, control the touch screen 110 to display the translucent memo screen including a first content included in the first execution screen based on a user input for selecting the first content through the touch screen 110, control the touch screen 110 to switch the first execution screen of the content application to a second execution screen of the content application for displaying the second execution screen control the touch screen 110 to display the memo screen of the memo application in the foreground in a translucent manner with the memo screen superimposed on the second execution screen of the content application being executed in the background, control the touch screen 110 to display the translucent memo screen including a second content included in the second execution screen based on a user input for selecting the second content, and store the memo screen including the first content and the second content in the memory 130.

According to various embodiments, the memory 130 may include at least one instruction configured to, when executed, cause at least one processor 120 to select a user input target application as an application being executed in the background, and switch the first execution screen to the second execution screen based on the user input on the memo screen.

According to various embodiments, the user input for selecting the first content included in the first execution screen may be a user input to an area corresponding to the first content in the memo screen. Alternatively, the user input for selecting the first content included in the first execution screen may be a user input for drawing based on an area corresponding to the first content or drawing so as to include at least a portion of the area, in the memo screen.

According to various embodiments, the memory 130 may include at least one instruction configured to, when executed, cause at least one processor 120 to control the touch screen 110 to display a screen selection UI for performing switching such that the user input is performed on the content application being executed in the background.

According to various embodiments, the memory 130 may include at least one instruction configured to, when executed, at least one processor 120, to acquire information linked to the first content or the second content based on the user input for selecting the first content or the second content.

According to various embodiments, the memory 130 may include at least one instruction configured to, when executed, at least one processor 120 to control the touch screen 110 to display a screen based on the information linked to the first content or the second content based on the user input for selecting the first content or the second content included in the memo screen.

According to various embodiments, the memory 130 may include at least one instruction configured to, when executed, cause at least one processor 120 to control the touch screen 110 to display a transparency adjustment UI by which the transparency of the memo screen is adjustable, and adjust the transparency of the memo screen based on a user input for manipulating the transparency adjustment UI.

According to various embodiments, the memory 130 may store at least one instruction configured to, when executed, cause at least one processor 120 to control the touch screen 110 to display a translucent memo screen including a function selection UI including a plurality of function items that are performable on the first content based on a user input for selecting the first content, and to control the touch screen 110 to display a translucent memo screen including the first content based on a user input for selecting one from among the plurality of function items. In this case, the plurality of function items may include at least one of an item for displaying the first content on the memo screen, an item for temporarily copying the first content to a clipboard, an item function for downloading the first content, or an item for sharing the first content with a third party.

The processor 120 may control the overall operation of the electronic device 110. For example, the processor 120 may perform various operations by copying various software programs or instructions stored in the memory 130 to the RAM and executing the programs or instructions.

Specifically, the processor 120 may control the touch screen 110 to display the memo screen of the memo application in the foreground in a translucent manner with the memo screen superimposed on the first execution screen of the content application being executed in the background. The processor 120 may control the touch screen 110 to display the translucent memo screen including a first content included in the first execution screen based on a user input for selecting the first content through the touch screen 110. The processor 120 may control the touch screen 110 to switch the first execution screen of the content application to the second execution screen of the content application for displaying the second execution screen. The processor 120 may control the touch screen 110 to display the memo screen of the memo application in the foreground in a translucent manner with the memo screen superimposed on the second execution screen of the content application being executed in the background. The processor 120 may control the touch screen 110 to display the translucent memo screen including a second content included in the second execution screen based on a user input for selecting the second content, and processor 120 may store the memo screen including the first content and the second content in the memory 130.

Figure 2A:
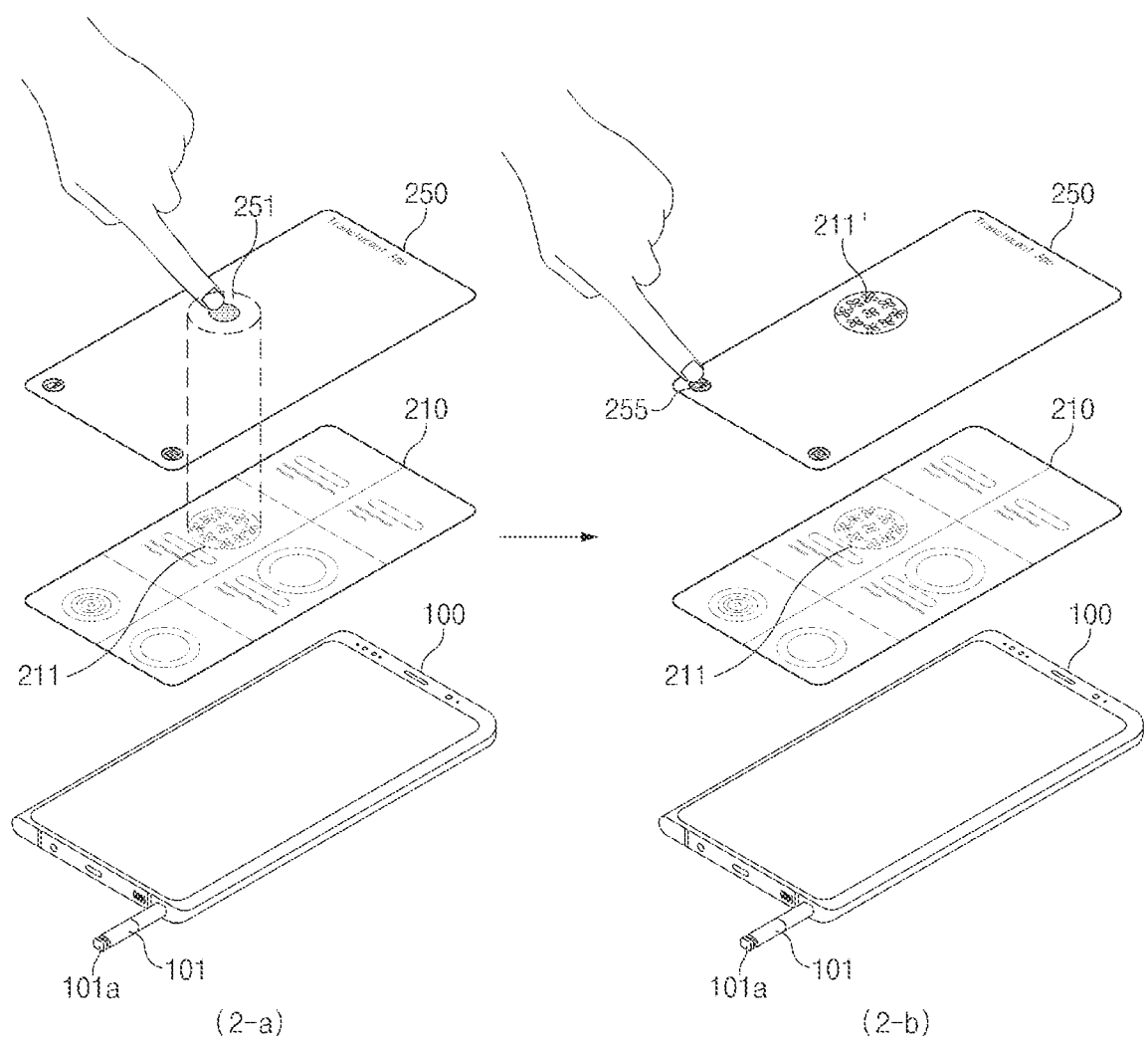
FIG. 2A is a diagram illustrating a process of controlling an application according to an embodiment of the present disclosure.
Figure 2B:
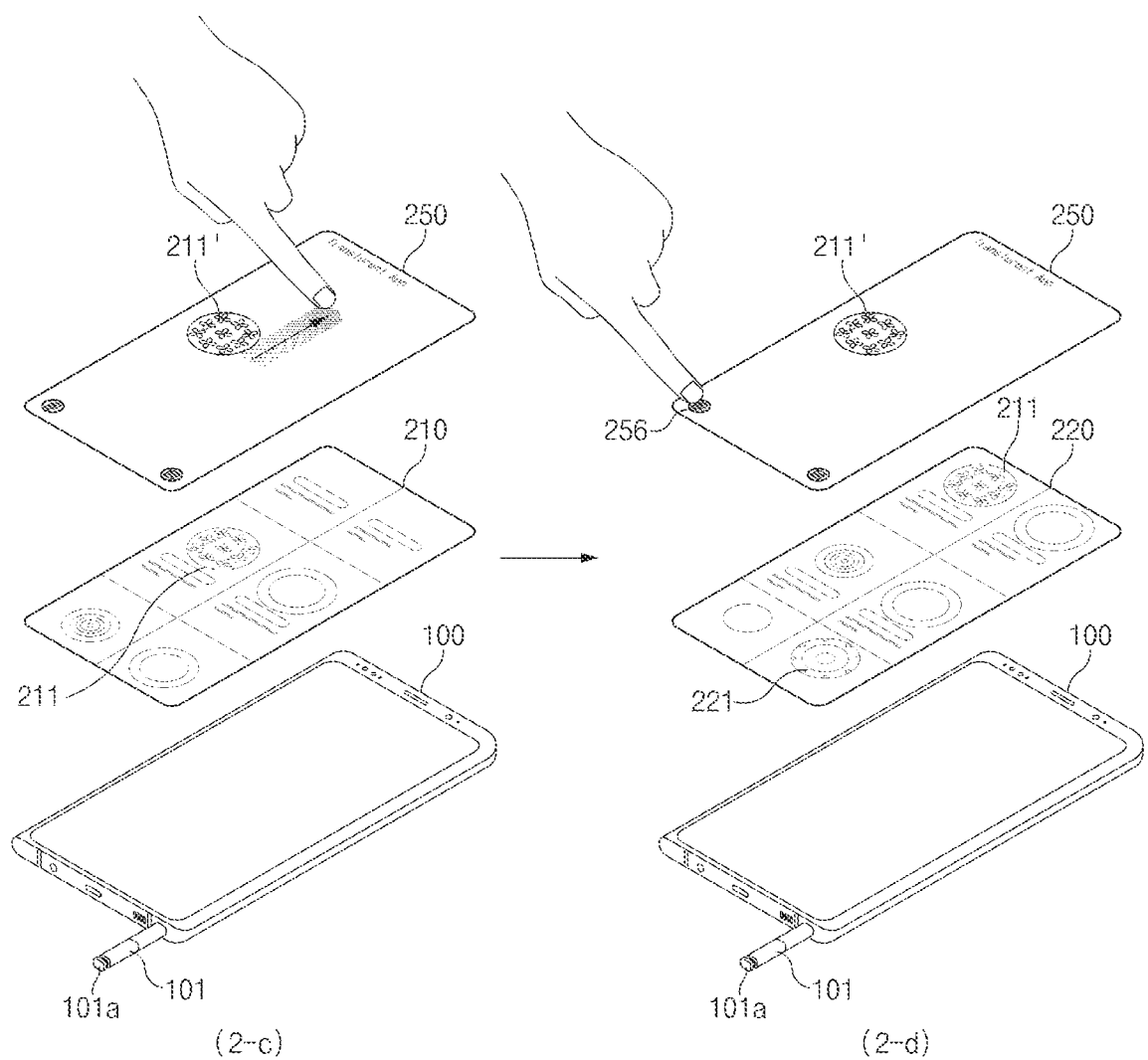
FIG. 2B is a diagram illustrating the process of controlling an application according to an embodiment of the present disclosure.
Figure 2C:
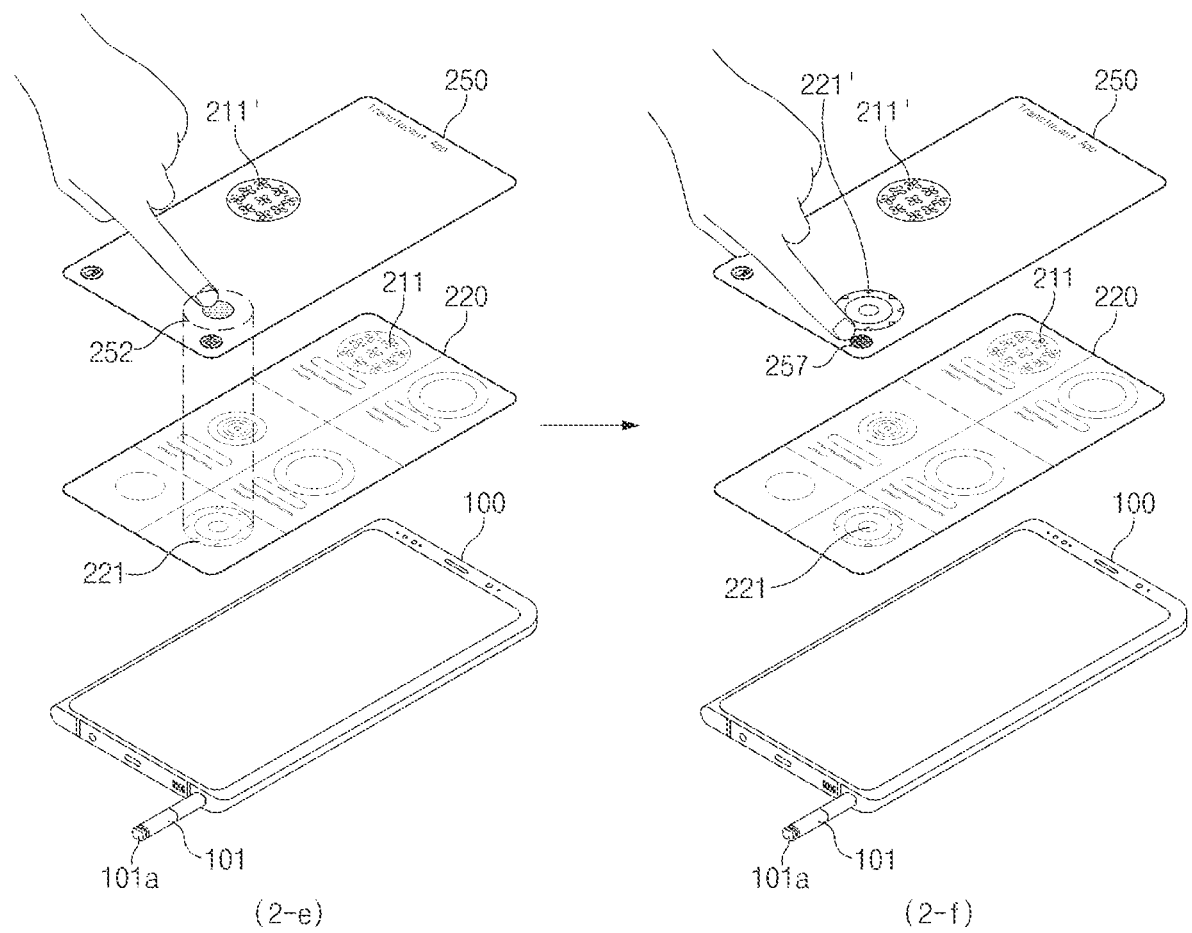
FIG. 2C is a diagram illustrating the process of controlling an application according to an embodiment of the present disclosure.

FIGS. 2a to 2c are diagrams illustrating a process of controlling an application according to an embodiment of the present disclosure.

In 2-a of FIG. 2a, the processor 120 may control the touch screen 110 to display a memo screen 250 of the memo application in the foreground in a translucent manner with the memo screen superimposed on a first execution screen 210 of the content application being executed in the background.

Here, the memo application may be automatically executed when the electronic pen 101 is separated, automatically executed when a button 101a of the electronic pen 101 is selected, automatically executed when an icon corresponding to the memo application is selected on the home screen, or automatically executed when the icon corresponding to the memo application is selected in a menu widget, for example.

The content application may provide a plurality of execution screens. The plurality of execution screens may be a plurality of screens respectively corresponding to a plurality of pages constituting one layer provided by the content application, or may be a plurality of screens respectively corresponding to a plurality of layers provided by the content application. If the plurality of execution screens include the first execution screen and the second execution screen, the first execution screen and the second execution screen may partially overlap each other to have the same information. For example, a screen including additional information displayed by a user's touch and drag on the first execution screen may be the second execution screen. Alternatively, the first execution screen and the second execution screen may be screens in which the same information is displayed differently. For example, a screen enlarged or reduced by the user's zoom-in gesture or zoom-out gesture on the first execution screen may be the second execution screen.

In this case, the processor 120 may acquire input data for a user input for selecting a first content 211 included in the first execution screen 210 through the touch screen 110. For example, the processor 120 may acquire input data for a user input to an area 251 corresponding to the first content 211 on the memo screen 250. The user input may be, for example, a long touch input or a double touch input.

In 2-b of FIG. 2a, based on the user input, the processor 120 may control the touch screen 110 to display the memo screen 250 including a copied first content 211'. In this case, the first content 211' may be displayed in the same size or close to that of the first content 211 being displayed on the first execution screen 210, may be displayed in the original size of the first content 211, or may be displayed in a reduced or enlarged state in consideration of the size of the memo screen 250. According to an embodiment, based on the user input in 2-a of FIG. 2a, the processor 120 may further acquire at least one of the information linked to the first content 211, the type of the content application, or the execution state of the content application. The information linked to the content may include, for example, metadata linked to the content, a uniform resource locator (URL) linked to the content (e.g., a website address), and the like.

Meanwhile, on the touch screen 110, a screen selection UI 255 for performing switching such that the user input is performed on the content application being executed in the background may be displayed. In this case, the processor 120 may acquire input data for a user input for selecting the screen selection UI 255. The user input may be, for example, a touch input or a double touch input.

As shown in 2-*c* of FIG. 2*b*, based on the user input, the processor 120 may select a user input target application as the content application being executed in the background. In this case, the processor 120 may acquire input data for a user input on the memo screen 250 of the content application. The user input may be, for example, a drag input or a swipe input in one direction.

According to another embodiment, based on the user input, the processor 120 may control the touch screen 110 to display, in the foreground, the first execution screen 210 of the content application being executed in the foreground. In this case, the processor 120 may acquire input data for a user input on the first execution screen 210 of the content application. The user input may be, for example, a drag input or a swipe input in one direction.

As shown in 2-*d* of FIG. 2*b*, based on the user input, the processor 120 may switch the first execution screen 210 of the content application to a second execution screen 220 of the content application. In this case, a screen selection UI 256 for performing switching such that the user input is performed on a memo application may be displayed on the touch screen 110. In this case, the processor 120 may acquire input data for a user input for selecting the screen selection UI 256. The user input may be, for example, a touch input or a double touch input.

As shown in 2-*e* of FIG. 2*c*, based on the user input, the processor 120 may select a user input target application as the content application being executed in the background. In addition, the processor 120 may control the touch screen 110 to display the memo screen 250 of the memo application in the foreground in a translucent manner with the memo screen superimposed on the second execution screen 220 of the content application being executed in the background. In this case, on the memo screen 250, the first content 211', which has been displayed on the memo screen 250 in 2-*b* of FIG. 2*a*, may be continuously included.

In this case, the processor 120 may acquire input data for a user input for selecting a second content 221 included in the second execution screen 220 through the touch screen 110. For example, the processor 120 may acquire input data for a user input to an area 252 corresponding to the second content 221 on the memo screen 250. The user input may be, for example, a long touch input or a double touch input.

As shown in 2-*f* of FIG. 2*c*, based on the user input, the processor 120 may control the touch screen 110 to display the memo screen 250 including the second content 221'. In this case, not only the second content 221' but also the first content 211' may be displayed together on the memo screen 250. According to an embodiment, based on the user input, the processor 120 may further acquire at least one of the information linked to the second content 221, the type of the content application, or the execution state of the content application.

According to the method described above, the processor 120 may move (or clip) each of a plurality of contents included in the execution screen of the content application to the memo screen. For example, the processor 120 may move each of a plurality of contents included in different execution screens of the same content application to the memo screen, and move each of a plurality of contents included in the execution screens of different types of content applications to the memo screen.

Next, the processor 120 may store the memo screen 250. For example, a memo storage UI 257 for storing the memo screen 250 may be displayed on the touch screen 110. In this case, the processor 120 may acquire input data for a user input for selecting the memo storage UI 257. The user input may be, for example, a touch input or a double touch input.

Figure 2D:
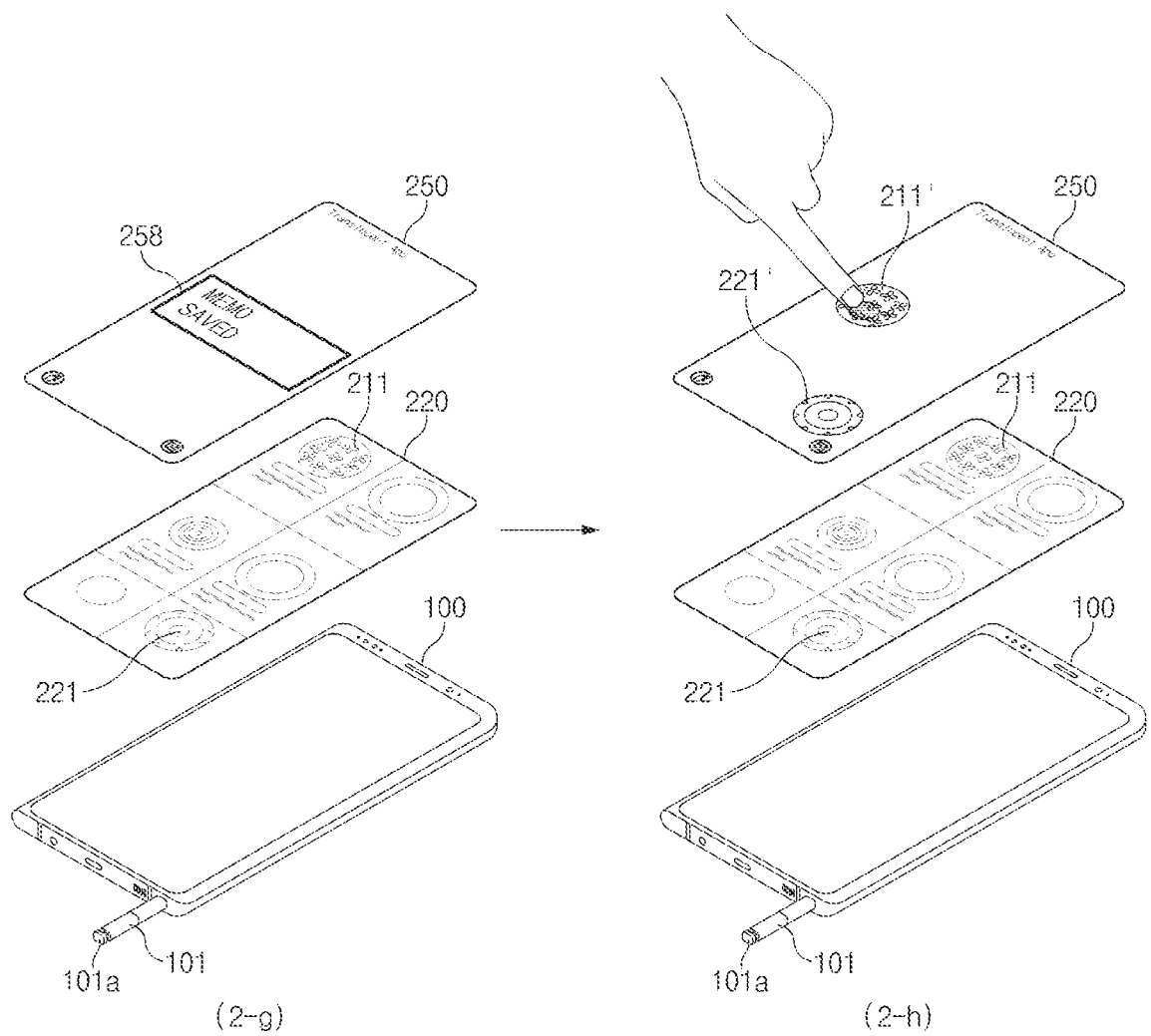
FIG. 2D is a diagram illustrating the process of controlling an application according to the embodiment of the present disclosure.

In 2-*g* of FIG. 2*d*, based on the user input, the processor 120 may control the touch screen 110 to display a message 258 indicating that the memo screen 250 has been saved.

Meanwhile, in a situation in which the memo screen 250 including at least one of the first content 211' and the second content 221' is being displayed, the processor 120 may acquire input data for a user input for selecting the first content 211' included in the memo screen 250, as shown in 2-*h* of FIG. 2*d*. The user input may be, for example, a touch input or a double touch input.

Figure 2E:
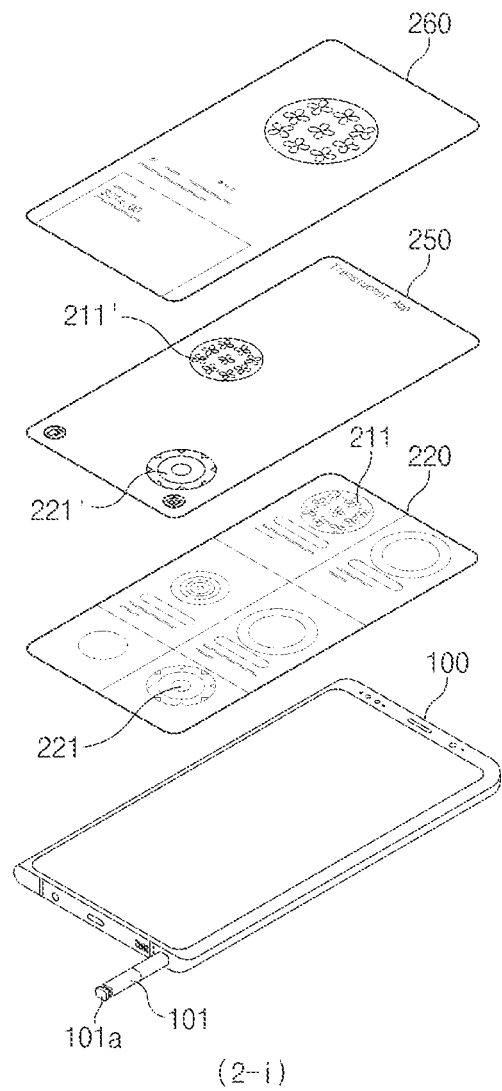
FIG. 2E is a diagram illustrating the process of controlling an application according to the embodiment of the present disclosure.

As shown in 2-*i* of FIG. 2*e*, based on the user input, the processor 120 may control the touch screen 110 to display a screen 260 based on information linked to the first content 211'. In this case, the information linked to the first content 211' may include information linked to the first content 211 acquired by the processor 120 based on the user input in 2-*b* of FIG. 2*a*. As the screen 260 based on information linked to the first content 211', the processor 120 may include a website screen based on a website address linked to the first content 211, for example.

Figure 3:
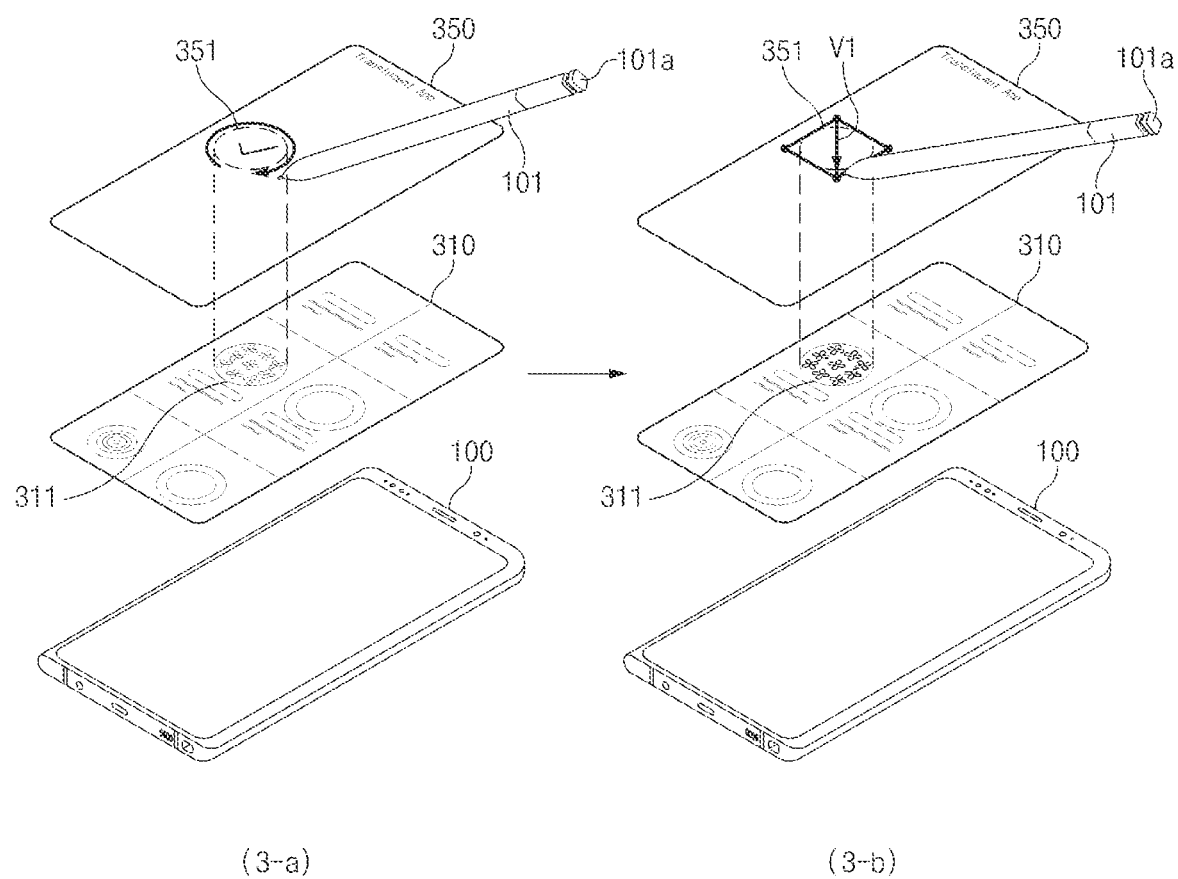
FIG. 3 is a diagram illustrating a process of selecting content according to an embodiment of the present disclosure.
Figure 4:
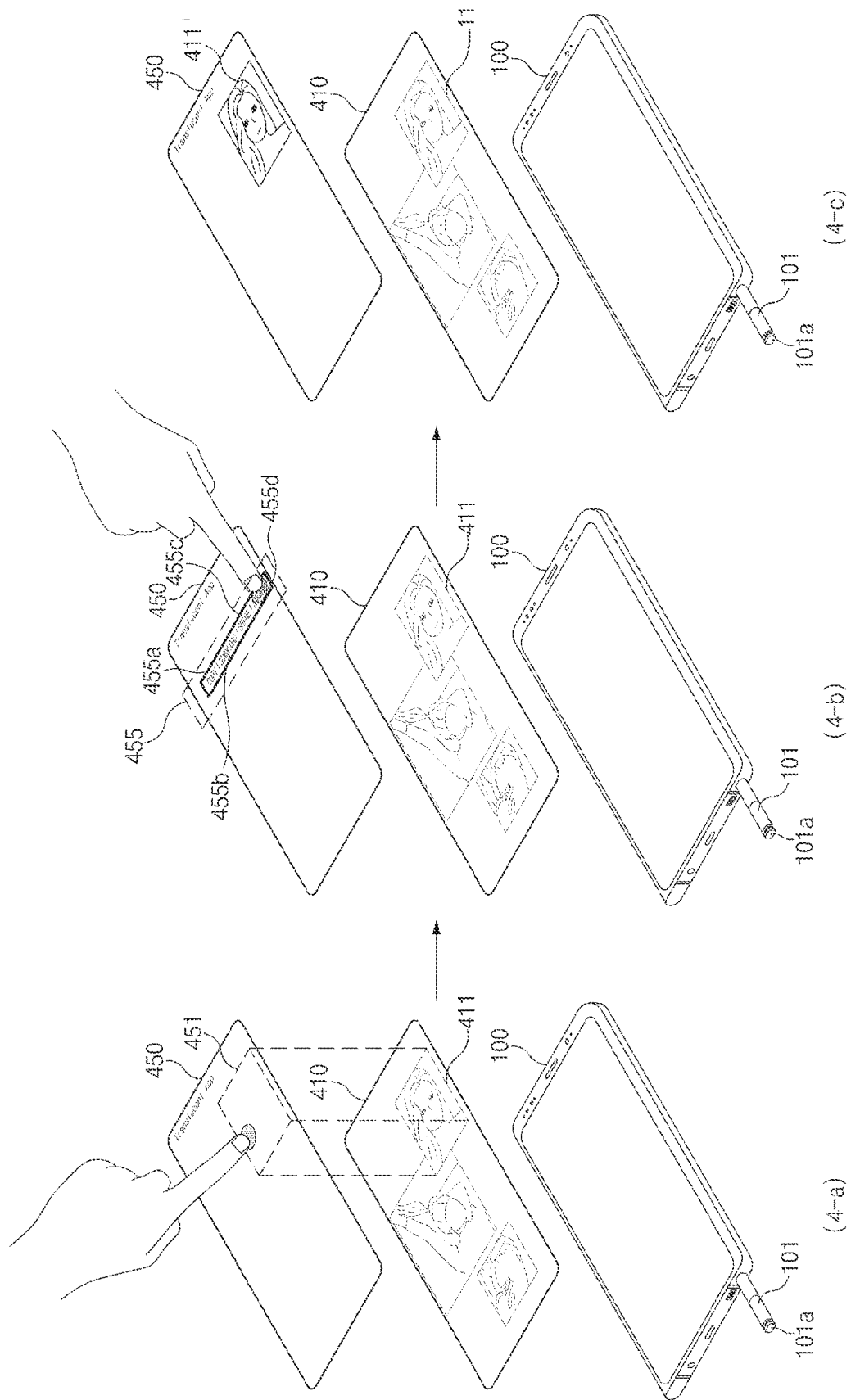
FIG. 4 is a diagram illustrating a process of selecting content according to an embodiment of the present disclosure.

FIGS. 3 and 4 are diagrams illustrating a process of selecting content according to an embodiment of the present disclosure.

As shown in 2-*a* of FIG. 2*a* or 2-*e* of FIG. 2*c* described above, if the user selects content, the user may select the content by using an electronic pen as well as a touch input for an area corresponding to the content.

For example, as shown in 3-*a* of FIG. 3, the user may draw using the electronic pen 101, based on an area 351 corresponding to content 311 included in the execution screen 310 of the content application. For example, the user may draw along the boundary of the area 351 corresponding to the content on the memo screen 350 and make a marking.

For another example, as shown in 3-*b* of FIG. 3, the user may draw using the electronic pen 101 so as to include at least a portion of the area 351 corresponding to the content 311 included in the execution screen 310 of the content application. For example, the user may draw from a point in a diagonal direction v1 to include the content 311.

Accordingly, if input data for a user input using the electronic pen is acquired, the processor 120 may select the content 311 corresponding to the drawing area from among the contents included in the content application, and control the touch screen 110 to display the memo screen 350 including the selected content.

For another example, as shown in 4-*a* of FIG. 4, the user may perform a user input on an area 451 corresponding to content 411 displayed on an execution screen 410 of the content application, in a memo screen 450. The user input may be, for example, a long touch input.

As shown in 4-*b* of FIG. 4, based on the user input, the processor 120 may display a function selection UI (e.g., a pop-up UI) 455 including a plurality of function items that are performable on the content 411. In this case, the plurality of function items may include, for example, at least one of an item 455*a* for temporarily copying the content 411 to the clipboard, an item 455*b* for downloading the content 411, an item 455*d* for sharing the content 411 to a third party, or an item 455*d* for copying the content 411 and displaying the content 411 on the memo screen.

In this case, as shown 4-*c* in FIG. 4, if a user input for selecting the item 455*d* for displaying the content 411 on the memo screen is performed, the processor 120 may control the touch screen 110 to display the memo screen 450 including content 411'. In this case, the processor 120 may automatically switch a user input target application to the memo application.

Figure 5A:
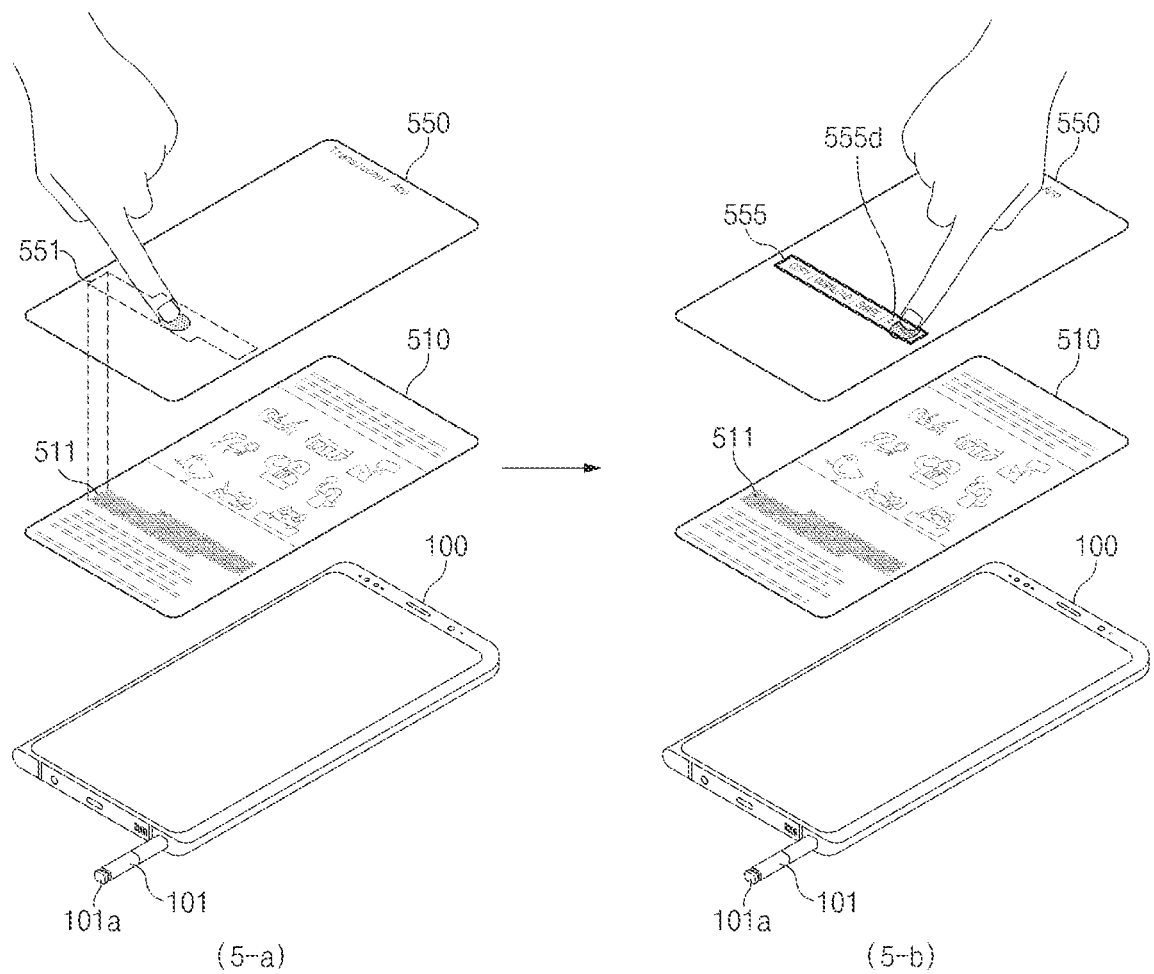
FIG. 5A is a diagram illustrating a process of selecting content according to another embodiment of the present disclosure.
Figure 5B:
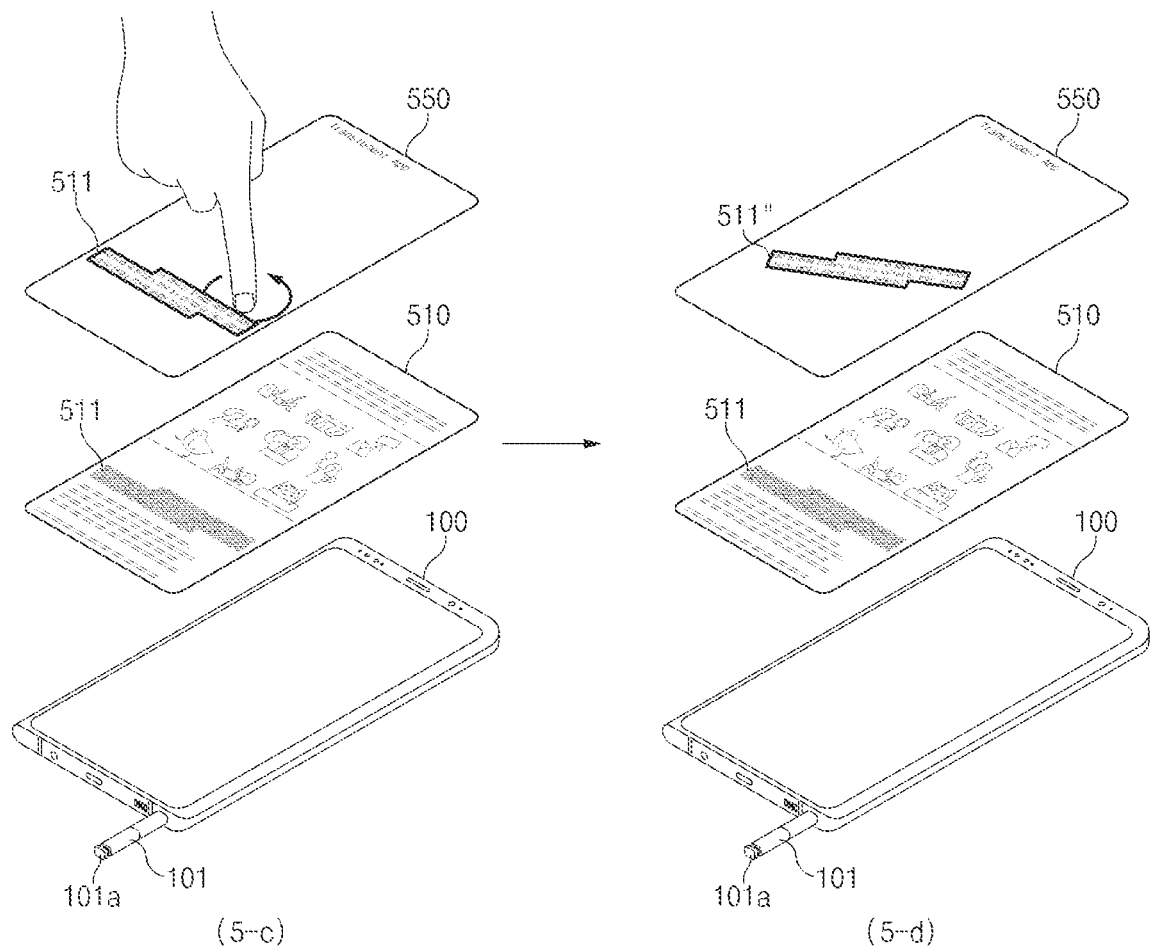
FIG. 5B is a diagram illustrating the process of selecting content according to the other embodiment of the present disclosure.

FIGS. 5a and 5b are diagrams illustrating a process of selecting content according to another embodiment of the present disclosure.

In FIG. 5a, if a user input target application is selected as the content application being executed in the background, the user may perform a user input for touching and dragging an area 551 corresponding to a sentence 511 included in an execution screen 510 of the content application on a memo screen 550 as another example of the content.

Then, if the user releases the touch, the processor 120 may display a function selection UI 555 including a plurality of function items that are performable on the sentence 511, as shown in 4-b of FIG. 4.

In this case, if a user input for selecting an item 555d for displaying the sentence 511 on the memo screen is performed, the processor 120 may control the touch screen 110 to display the memo screen 550 including a sentence 511', as shown 5-c in FIG. 5b.

The user may rotate the sentence 511'. For example, if the user drags in a circular arc direction (e.g., counterclockwise) in a state of touching one axis of the sentence 511', the processor 120 may control the touch screen 110 to display the memo screen 550 including a rotated sentence 511", as shown in 5-d of FIG. 5b.

Figure 6A:
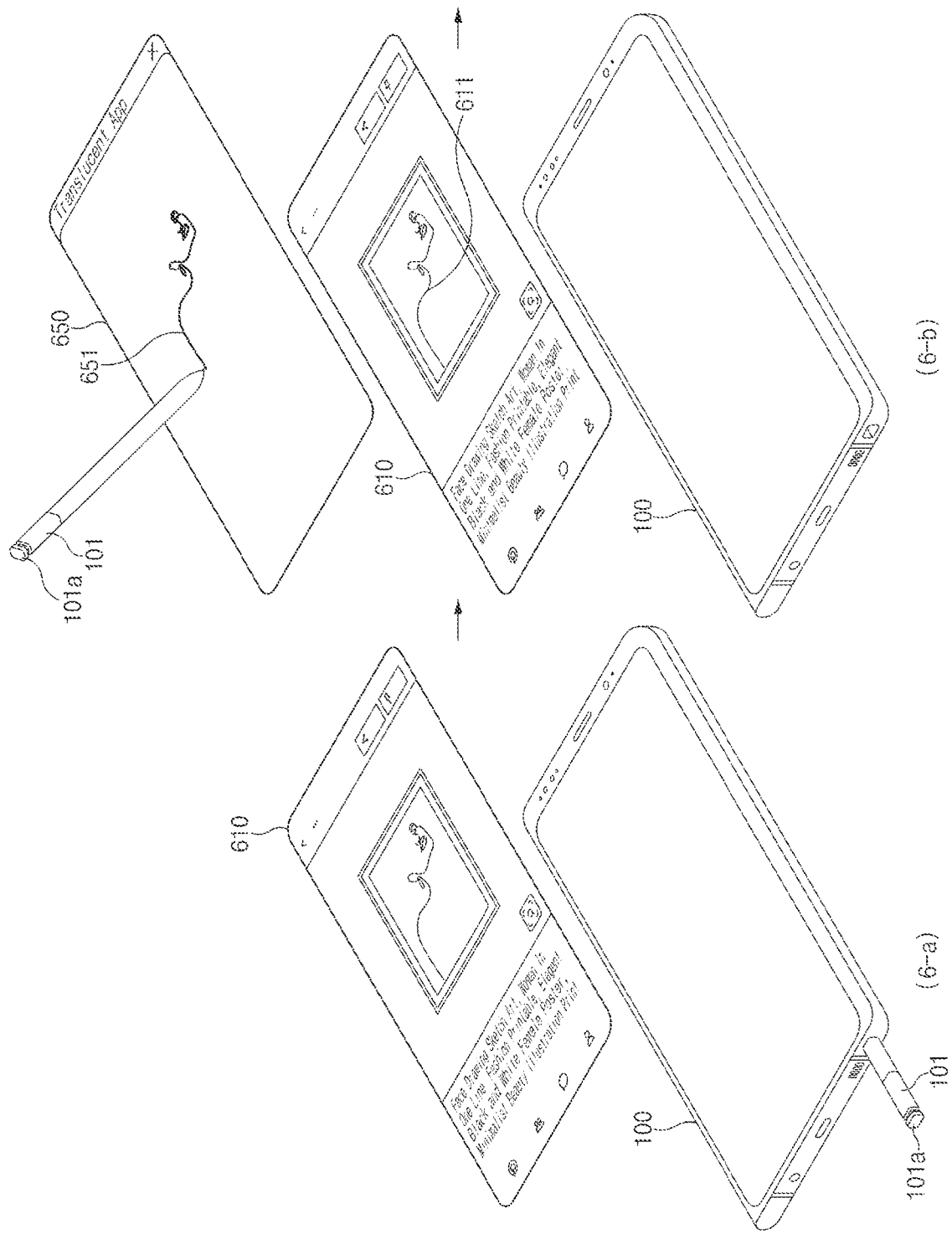
FIG. 6A is a diagram illustrating a process of controlling an application according to another embodiment of the present disclosure.
Figure 6B:
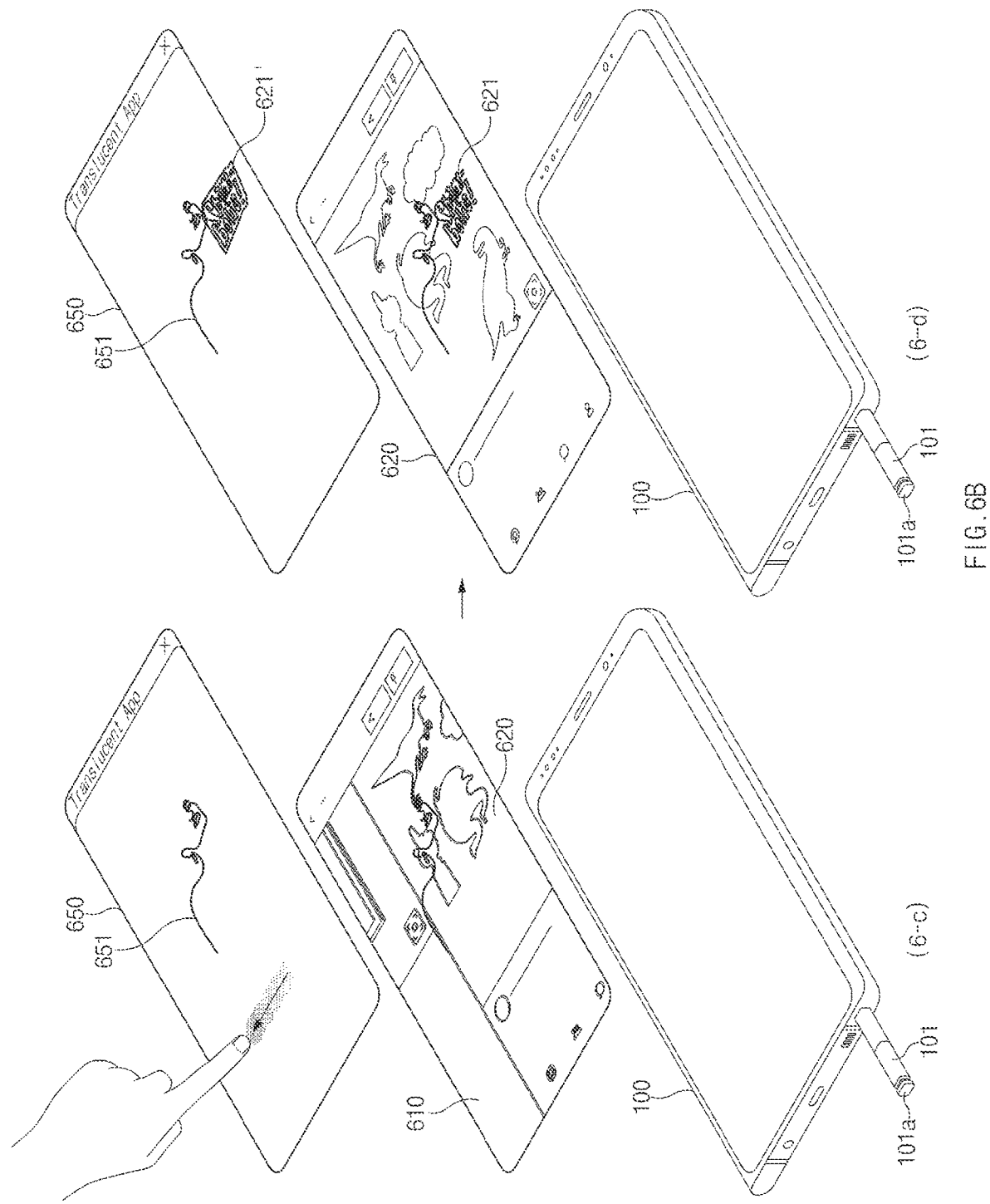
FIG. 6B is a diagram illustrating the process of controlling an application according to the other embodiment of the present disclosure.

FIGS. 6a to 6c are diagrams illustrating a process of controlling an application according to another embodiment of the present disclosure.

As shown in 6-a of FIG. 6a, as the user separates the electronic pen 101 from the electronic device 100 while a first execution screen 610 of the content application is being displayed, the processor 120 may execute the memo application and control the touch screen 110 to display a translucent memo screen 650, as shown in 6-b of FIG. 6a.

While the translucent memo screen 650 is being displayed, the user may perform a drawing operation on the memo screen 650 with reference to content 611 included in the first execution screen 610 of the content application. For example, the user may perform a user input for drawing along the boundary of the content 611 on the memo screen 650 by using the electronic pen 101.

If a drawing result 651 is displayed on the memo screen 650 based on the user input, the user may perform a user input for touching and dragging in order to find another drawing target, as shown in (6-c) of FIG. 6b. In this case, the processor 120 may perform a function based on a user input on the content application. For example, if user inputs for selecting a screen switching UI (not shown) such as the screen switching UI 255 of FIG. 2a and touching and dragging are performed, the processor 120 may perform the function based on the user input on the content application. For another example, the processor 120 may determine whether the input data for the user input is the input by the electronic pen 101 or the input by the user's finger, and when the input is identified as the input by the finger, the processor 120 may perform the function based on the user input on the content application.

As shown in 6-d of FIG. 6b, based on the user input for touching and dragging, the processor 120 may control the touch screen 110 to display a second execution screen 620 of the content application.

In this case, the user may perform an operation of copying the content 621 included in the second execution screen 620 of the content application to the memo screen 650. For example, the user may give an instruction to copy the content 621 to the memo screen 650 by long-pressing the area of the memo screen 650 corresponding to the content 621, as shown in 2-a of FIG. 2a, drawing so as to include at least a portion of the area of the memo screen 650 corresponding to the content 621, as shown in FIG. 3, or using the function selection UI including a plurality of function items, as shown in FIG. 4.

Accordingly, as shown in 6-d of FIG. 6b, the processor 120 may control the touch screen 110 to display content 621' which has been copied together with the drawing result 651 on the memo screen 650.

The user may store the memo screen 650 generated according to a work result as in the above embodiment and utilize the stored memo screen 650 in various areas.

For example, as shown in 6-e of FIG. 6c, the user may use an image based on the memo screen as a background of an always-on display (AOD). Alternatively, as shown in 6-f of FIG. 6c, the user may use the image as a background of a lock screen. Alternatively, as shown in 6-g of FIG. 6c, the user may use the image as a background of the home screen.

FIGS. 7a to 7c are diagrams illustrating a process of enlarging a screen provided by an application according to an embodiment of the present disclosure.

In 7-a of FIG. 7a, the processor 120 may control the touch screen 110 to display a memo screen 750 including a drawing result 751 in the foreground in a translucent manner while the content application is being executed in the background.

In this case, the user may wish to enlarge an execution screen 710 of the content application. Accordingly, the user may select a background screen selection UI 755 to set a user input target application as a content application, and perform a zoom-in gesture on the touch screen.

As shown in 7-b of FIG. 7a, based on the user input, the processor 120 may control the touch screen 110 to display an enlarged version of the execution screen 710 of the content application.

According to another embodiment, in 7-c of FIG. 7b, the user may wish to enlarge the memo screen 750 of the memo application. In this case, the user may select a foreground screen selection UI 756 to set a user input target application as a content application, and perform the zoom-in gesture on the touch screen.

As shown in 7-d of FIG. 7b, based on the user input, the processor 120 may control the touch screen 110 to display an enlarged version of the memo screen 750 of the memo application.

According to another embodiment, in 7-e of FIG. 7c, the user may wish to simultaneously enlarge the execution screen 710 and the memo screen 750 with one gesture. In this case, the user may select a dual screen selection UI 757 to set a user input target application as both the content application and the memo application, and perform the zoom-in gesture on the touch screen.

As shown in 7-f of FIG. 7c, based on the user input, the processor 120 may control the touch screen 110 to display enlarged versions of the execution screen 710 and the memo screen 750 together.

Meanwhile, in FIGS. 7a to 7c, the screen switching between the execution screen 710 of the content application, the memo screen 750 of the memo application, and the execution screen 710 and the memo screen 750 has been described as being selectively performed based on the user's zoom-in gesture; however, according to various embodiments, the screen switching between the execution screen 710 of the content application, the memo screen 750 of the memo application, and the execution screen 710 and the memo screen 750 may be selectively performed based on various kinds of the user's gestures, such as zoom-out gesture, touch drag gesture, swipe gesture, scroll gesture, or the like.

Accordingly, it is possible for the user to perform drawing on or make a copy of the content to the memo screen while navigating the execution screen of the content application in various ways.

Figure 8A:
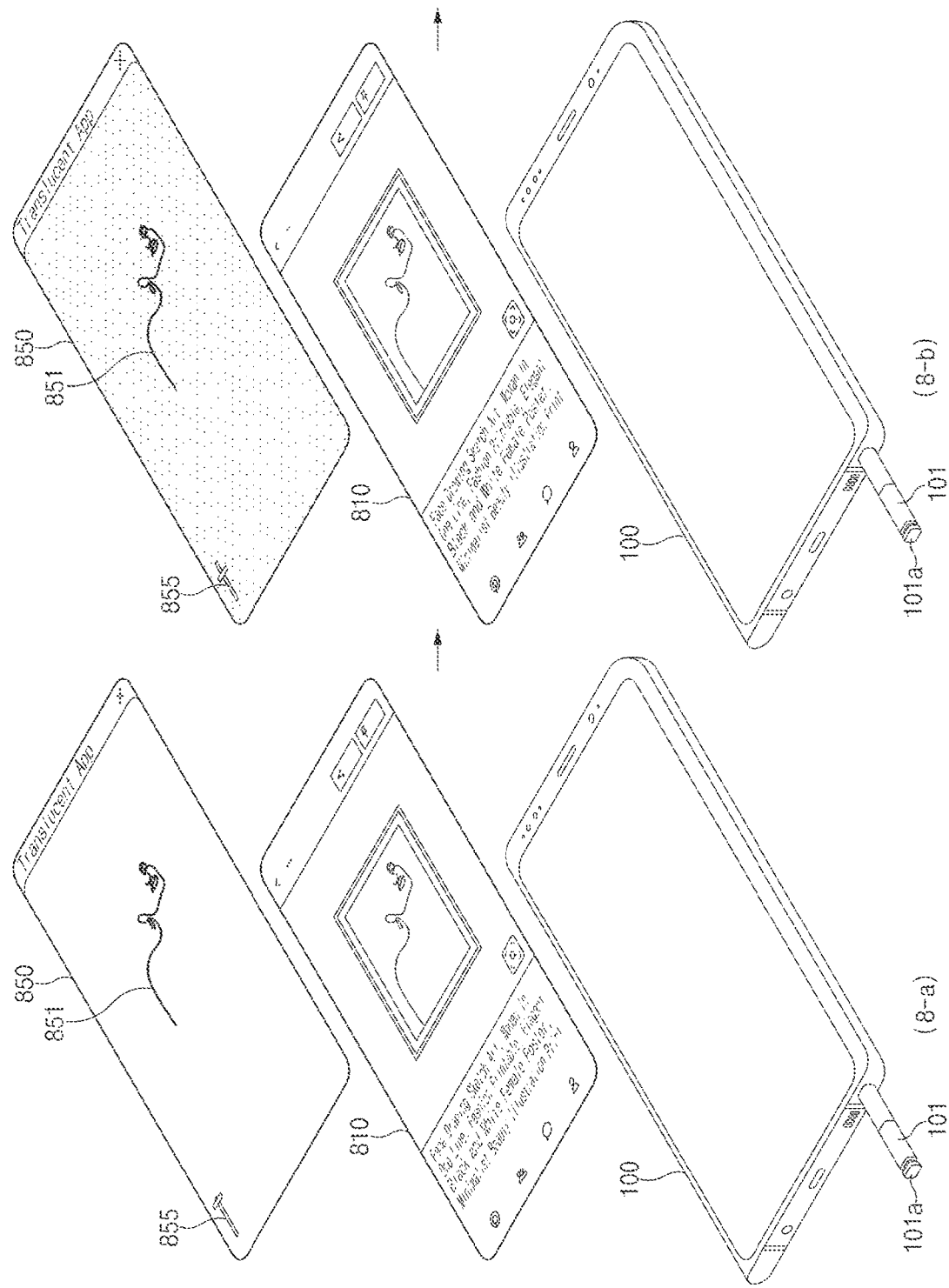
FIG. 8A is a diagram illustrating a process of adjusting the transparency of a memo screen according to an embodiment of the present disclosure.
Figure 8B:
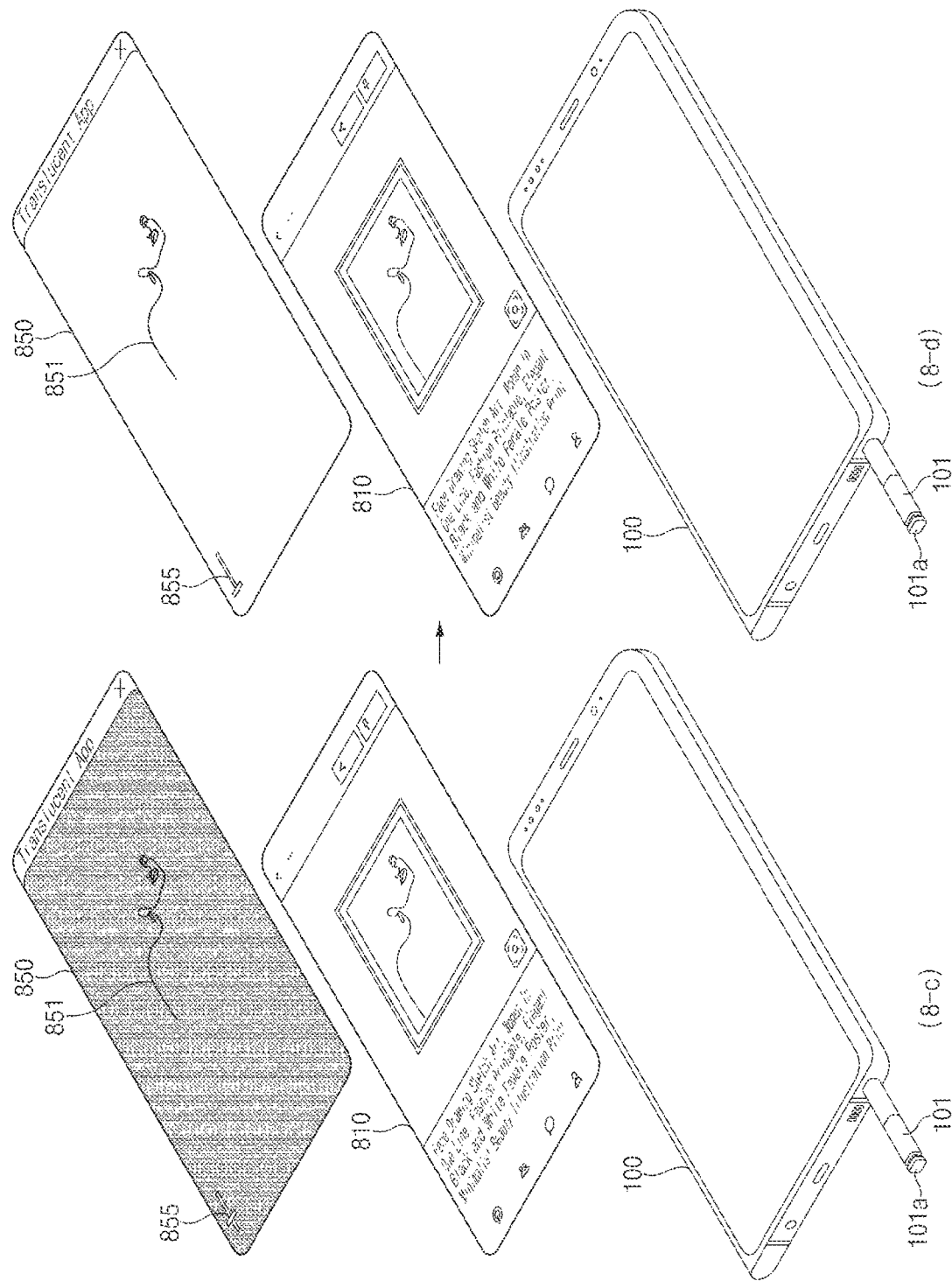
FIG. 8B is a diagram illustrating the process of adjusting the transparency of a memo screen according to the embodiment of the present disclosure.

FIGS. 8*a* and 8*b* are diagrams illustrating a process of adjusting the transparency of a memo screen according to an embodiment of the present disclosure.

In FIGS. 8*a* and 8*b*, the processor 120 may control the touch screen 110 to display a memo screen 850 in the foreground in a translucent manner while the content application is being executed in the background.

In this case, the memo screen 850 may include a transparency adjustment UI 855 by which the transparency of the memo screen 850 is adjustable. Based on a user input for manipulating the transparency adjustment UI 855, the processor 120 may determine the transparency of the memo screen 850 or the display level of an execution screen 810 of the content application.

According to an embodiment, as shown in 8-*a* of FIG. 8*a*, the transparency of the memo screen 850 may be set to the highest level. In this case, the processor 120 may control the touch screen 110 to display the execution screen 810 of the content application, and the transparent memo screen 850 superimposed on the execution screen 810 and including the user's drawing result 851 or content (not shown) selected by the user.

According to another embodiment, as shown in 8-*d* of FIG. 8*b*, the transparency of the memo screen 850 may be set to the lowest level. In this case, the processor 120 may control the touch screen 110 not to display the execution screen 810 of the content application, and to display the opaque memo screen 850 including the user's drawing result 851.

According to another embodiment, as shown in 8-*b* or 8-*c* of FIG. 8*a*, the transparency of the memo screen 850 may be set to a normal level. In this case, the processor 120 may control the touch screen 110 to display the execution screen 810 of the content application in a dim state by the translucent memo screen 850.

Figure 9:
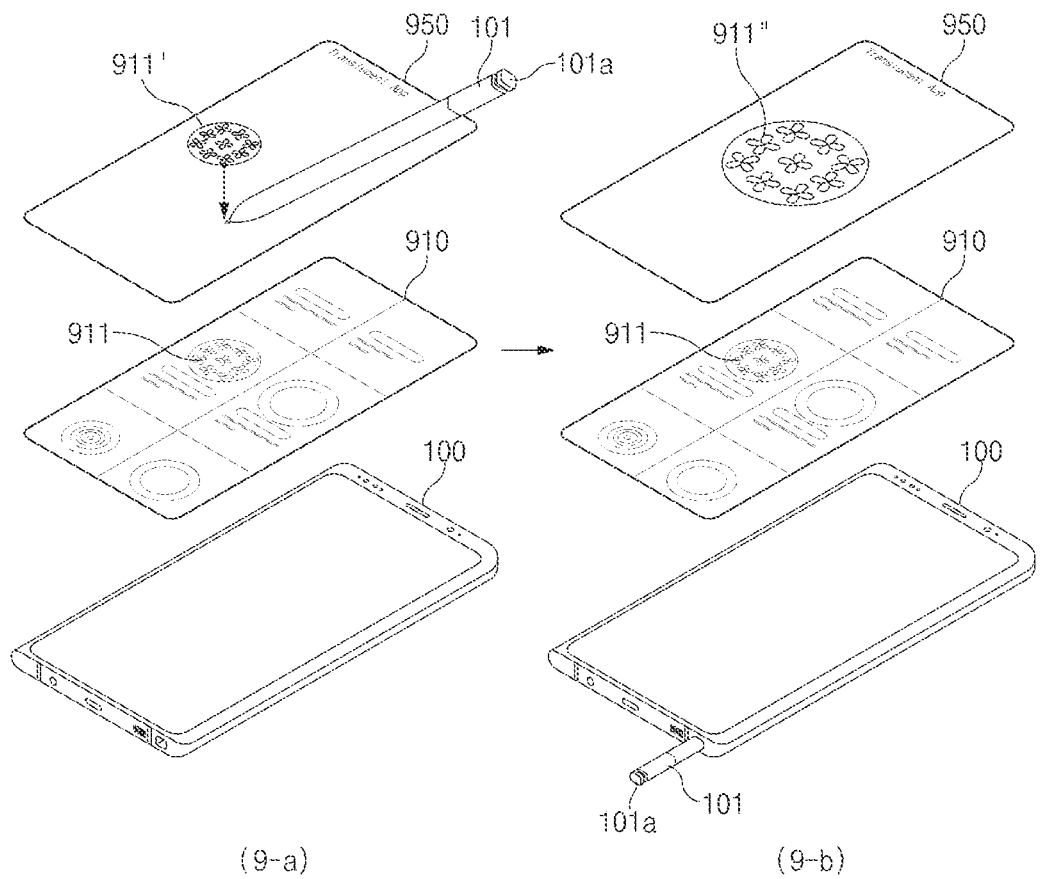
FIG. 9 is a diagram illustrating a process of transforming content according to an embodiment of the present disclosure.

FIG. 9 is a diagram illustrating a process of transforming content according to an embodiment of the present disclosure.

If content 911 included in an execution screen 910 of the content application is selected as shown in FIGS. 3 and 4 described above, the processor 120 may control the touch screen 110 to display a memo screen 950 including copied content 911', as shown 9-*a* in FIG. 9. In this case, the user may select a point of the content 911' or the boundary of an area including the content 911' in a state in which the content 911' included in the memo screen 950 is selected, and drag the selected point or boundary in one direction.

As shown in 9-*b* of FIG. 9, based on the user input, the processor 120 may control the touch screen 110 to display modified content 911". For example, as shown in 9-*b* of FIG. 9, the processor 120 may control the touch screen 110 to display an enlarged, reduced, moved, or rotated version of the content according to the user input.

Figure 10:
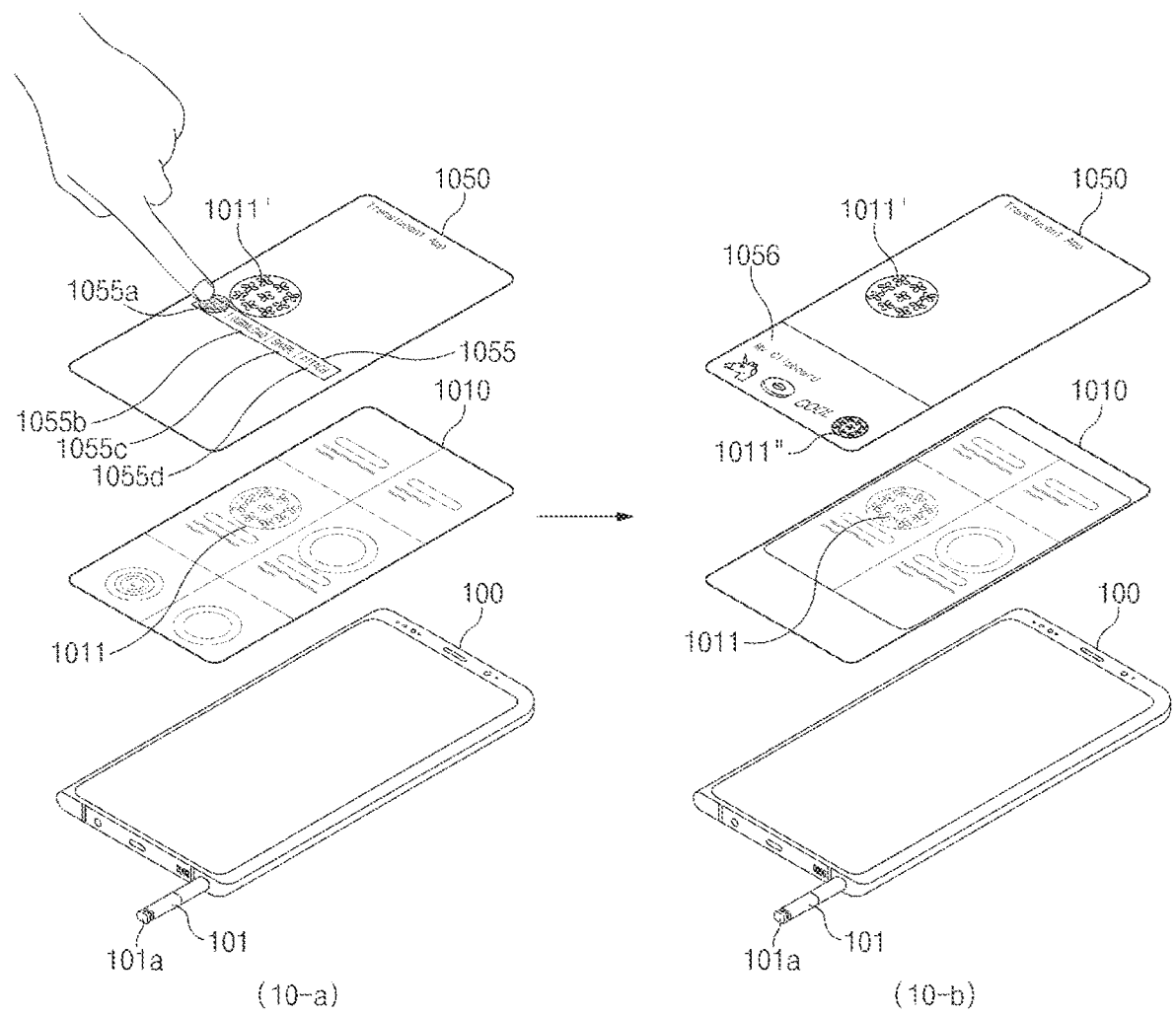
FIG. 10 is a diagram illustrating a process of copying content to a clipboard according to an embodiment of the present disclosure.

FIG. 10 is a diagram illustrating a process of copying content to a clipboard according to an embodiment of the present disclosure.

If content 1011 included in an execution screen 1010 of the content application is selected as shown in FIGS. 3 and 4 described above, the processor 120 may control the touch screen 110 to display a memo screen 1050 including copied content 1011', as shown 10-*a* in FIG. 10. In this case, the processor 120 may control the touch screen 110 to display a function selection UI (e.g., a pop-up UI) 1055 including a plurality of function items that are performable on the content 1011'. For example, the processor 120 may control the touch screen 110 to display the function selection UI 1055 based on a user input of long-pressing the copied content 1011' with the electronic pen or the user's finger or double touching. In this case, the plurality of function items may include, for example, at least one of an item 1055*a* for copying the copied content 1011' to the clipboard, an item 1055*b* for downloading the content 1011', or an item 1055*c* for sharing content 1011' with a third party.

In this case, as shown in 10-*b* in FIG. 10, if a user input for selecting the item 1055*a* for copying the copied content 1011' to the clipboard is performed, the processor 120 may control the touch screen 110 to display a clipboard 1056 including the copied content 1011". According to various embodiments, if the content 1011' is transformed as shown in FIG. 9, the processor 120 may control the touch screen to display the clipboard 1056 including the transformed content.

Figure 11B:
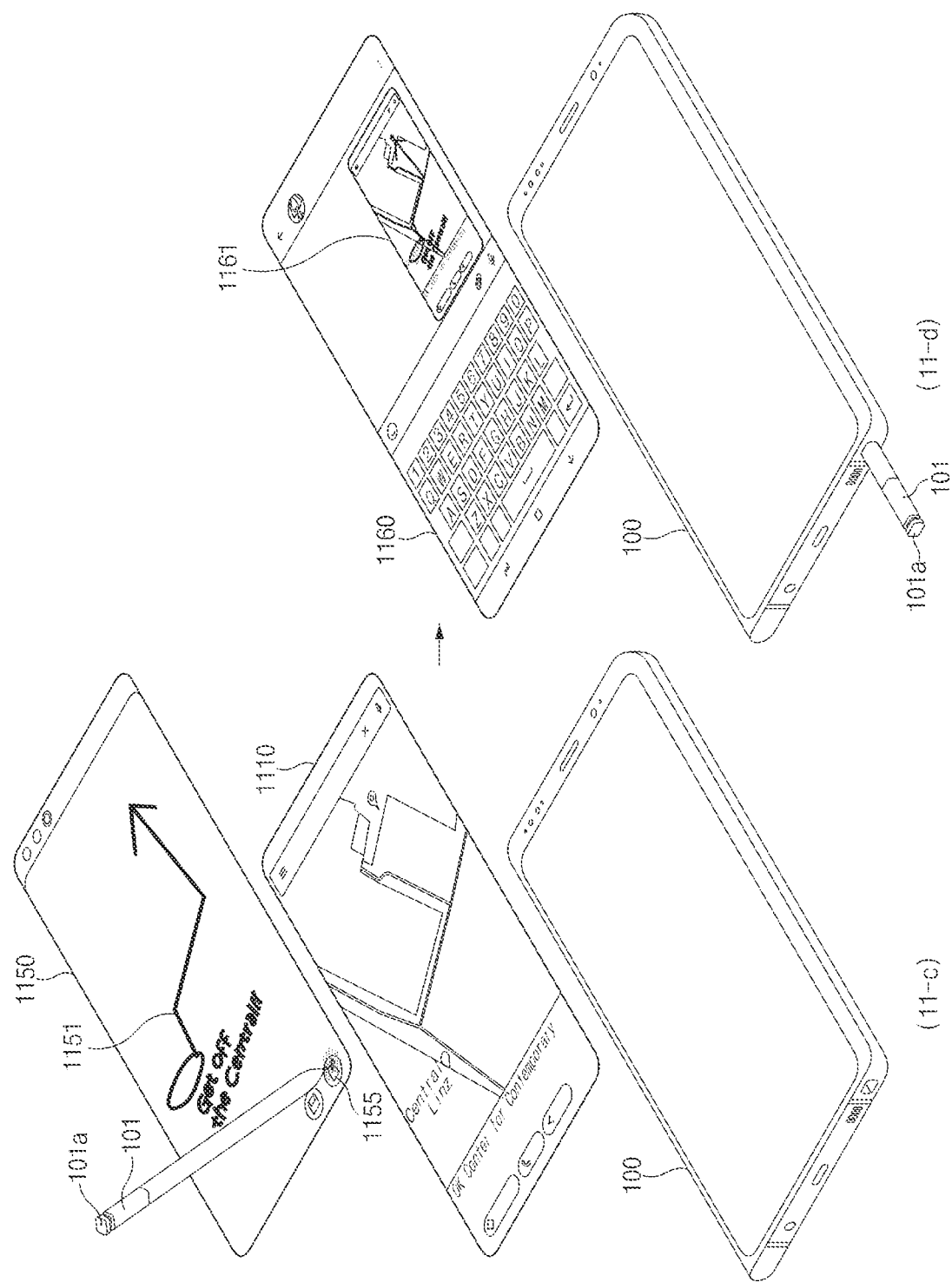
FIG. 11B is a diagram illustrating the process of sharing content according to the embodiment of the present disclosure.

FIGS. 11*a* and 11*b* are diagrams illustrating a process of sharing content according to an embodiment of the present disclosure.

As shown in 11-*a* of FIG. 11*a*, the processor 120 may control the touch screen 110 to display a map screen 1110 of the content application. In this case, the content application may be, for example, a map application.

In this case, as shown in 11-*b* of FIG. 11, based on a user input for requesting execution of the memo application, the processor 120 may control the touch screen 110 to display a memo screen 1150 in a superimposed state on the map screen 1110 of the map application. The user input for requesting execution of the memo application may be, for example, a user input for separating the electronic pen from the electronic device 100.

In 11-*b* of FIG. 11*a*, the user may perform the user input on the memo screen 1150 by referring to the map screen 1110 of the map application. The user input may be, for example, a user input to the memo screen 1150 for marking or drawing a specific point, a specific direction, a specific distance, or the like on the map included in the map screen 1110.

Next, in 11-*c* of FIG. 11*b*, the user may select a memo sharing UI 1155 for sharing the memo screen 1150 and the background screen (e.g., the map screen 1110).

As shown in 11-*d* of FIG. 11*b*, based on the user input, the processor 120 may execute a sharing application (e.g., a message application) 1160, and attach an image 1161 including at least a portion of the memo screen 1150 and at least a portion of the map screen 1110. Then, based on the user's sharing confirmation, the processor 120 may control a communication unit to transmit the image 1161 to a third party.

Figure 12A:
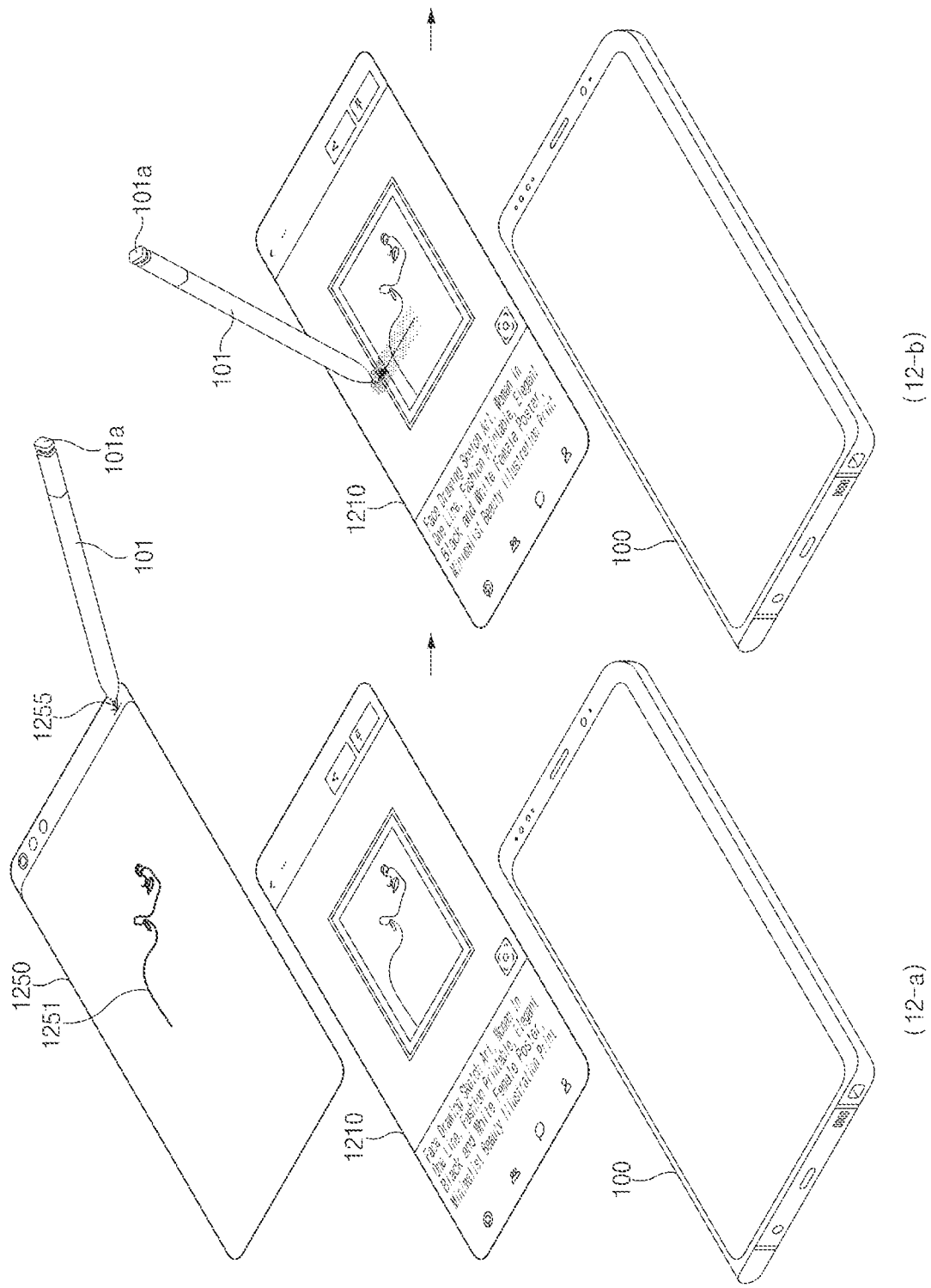
FIG. 12A is a diagram illustrating a process of displaying a memo screen according to an embodiment of the present disclosure.
Figure 12B:
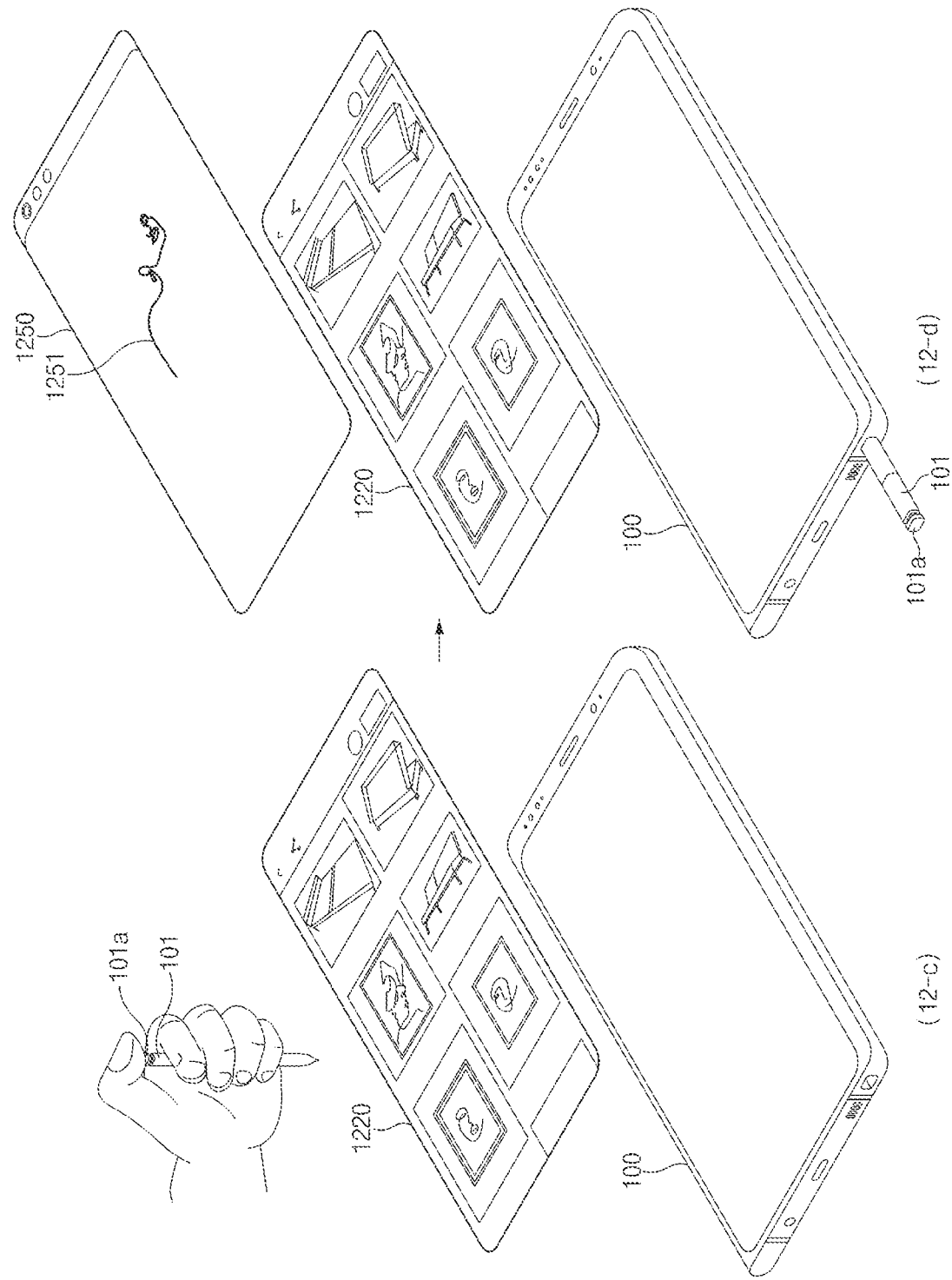
FIG. 12B is a diagram illustrating the process of displaying a memo screen according to the embodiment of the present disclosure.

FIGS. 12*a* and 12*b* is diagrams illustrating a process of displaying a memo screen according to an embodiment of the present disclosure.

In 12-*a* of FIG. 12*a*, the processor 120 may control the touch screen 110 to display a memo screen 1250 including a drawing result 1251 in the foreground in a translucent manner while the content application is being executed in the background. In this case, the memo screen 1250 may include a screen closing UI 1255 for closing the memo screen 1250.

As shown in 12-*b* of FIG. 12*a*, based on a user input for selecting the screen closing UI 1255, the processor 120 may control the touch screen 110 to close the memo screen 1250 and display a first execution screen 1210 of the content application. The user may perform a user input on the first execution screen 1210. For example, the user may perform a touch drag or swipe input using the electronic pen 101 on the first execution screen 1210.

As shown in 12-*c* of FIG. 12*b*, based on the user input, the processor 120 may control the touch screen 110 to display a second execution screen 1220 of the content application.

The user may select the button 101*a* of the electronic pen 101 to display the memo screen 1250 again on the second execution screen 1220. For example, in a situation in which the electronic pen 101 is separated from the electronic device 100, the electronic device 100 may acquire input data for a user input of pressing the button 101*a* at the top of the electronic pen 101.

As shown in 12-*d* of FIG. 12*b*, based on the user input, the processor 120 may control the touch screen 110 to display the memo screen 1250 again in a translucent manner with the memo screen 1250 superimposed on the second execution screen 1220 of the content application. In this case, the memo screen 1250 may include the drawing result 1251 or content displayed in 12-*a* of FIG. 12.

Figure 13A:
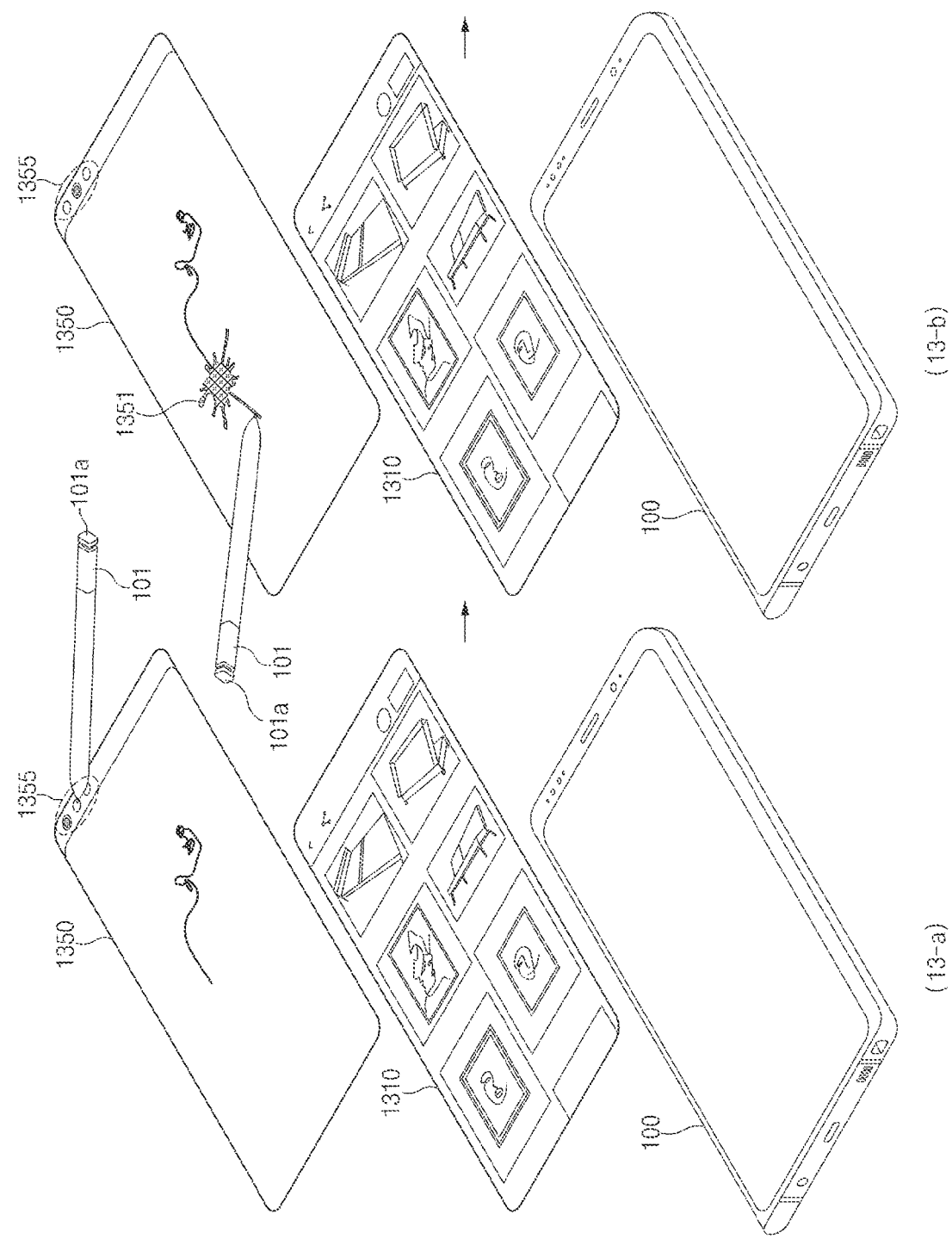
FIG. 13A is a diagram illustrating a process of changing a drawing color according to an embodiment of the present disclosure.
Figure 13B:
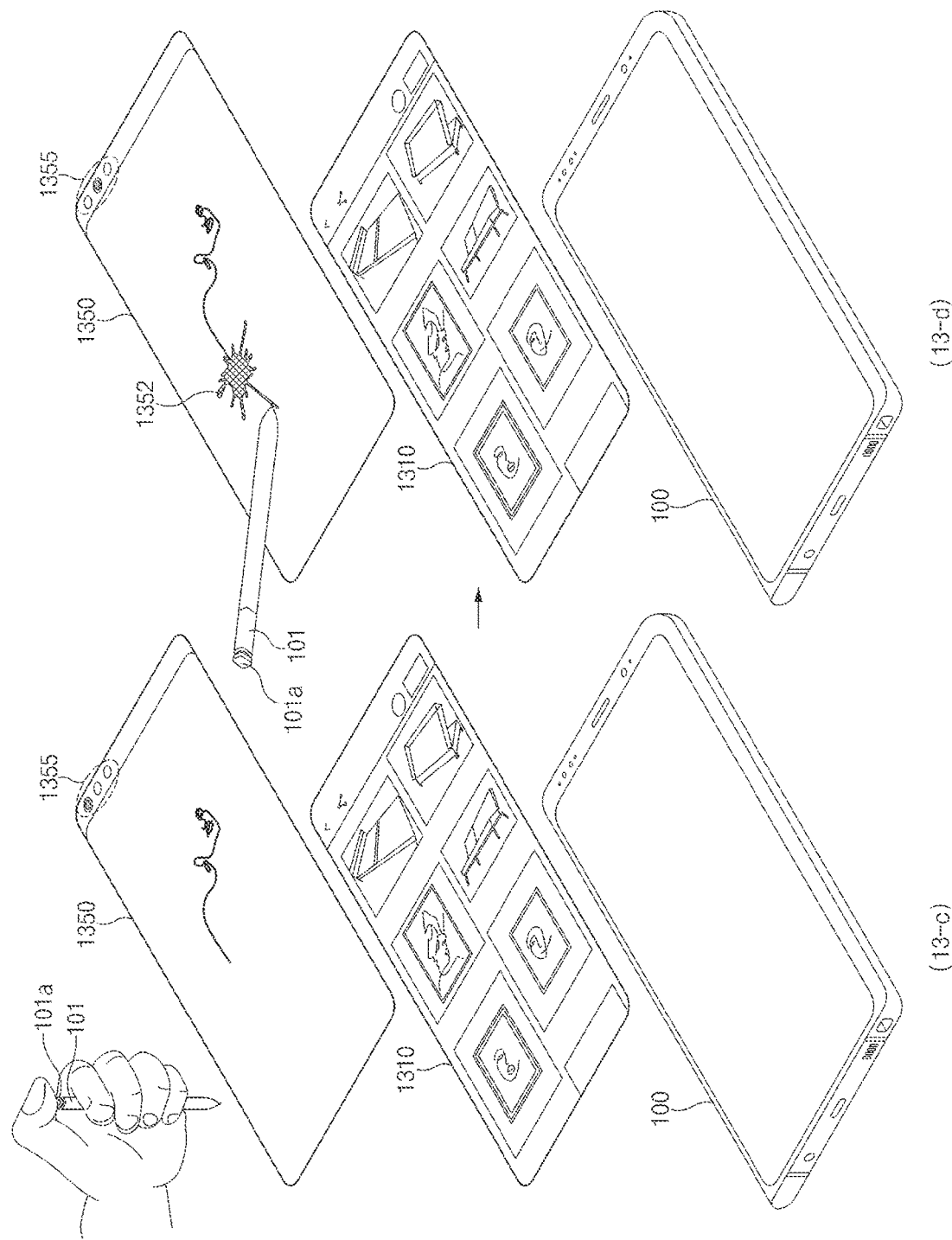
FIG. 13B is a diagram illustrating the process of changing a drawing color according to the embodiment of the present disclosure.

FIGS. 13*a* and 13*b* are diagrams illustrating a process of changing a drawing color according to an embodiment of the present disclosure.

The processor 120 may change a drawing color on the memo screen according to the user's preference. FIG. 13*a*, the memo screen 1350 may include a color change UI 1355 for changing the drawing color.

According to an embodiment, as shown in 13-*a* of FIG. 13*a*, the user may perform a user input for selecting one color from among the colors included in the color change UI 1355. For example, if the existing drawing color is a first color (e.g., white), the user may select a second color (e.g., yellow). Based on the user input, the processor 120 may change the drawing color from the first color to the second color.

If the user performs a drawing input on the memo screen 1350 in a state in which the drawing color is changed, the processor 120 may control the touch screen 110 to display a drawing result 1351 of the second color, as shown 13-*b* of FIG. 13*a*.

According to another embodiment, as shown in 13-*c* of FIG. 13*b*, in a state in which the memo screen 1350 is displayed, the user may press the button 101*a* of the electronic pen 101. Whenever the user presses the button 1301 of the electronic pen, one color among colors included in the color change UI 1355 may be sequentially highlighted, and the processor 120 may sequentially change the drawing color.

If the user performs a drawing input on the memo screen 1350 in a state in which the drawing color is changed, the processor 120 may control the touch screen 110 to display a drawing result 1352 of the changed color, as shown 13-*d* of FIG. 13*b*.

Figure 14:
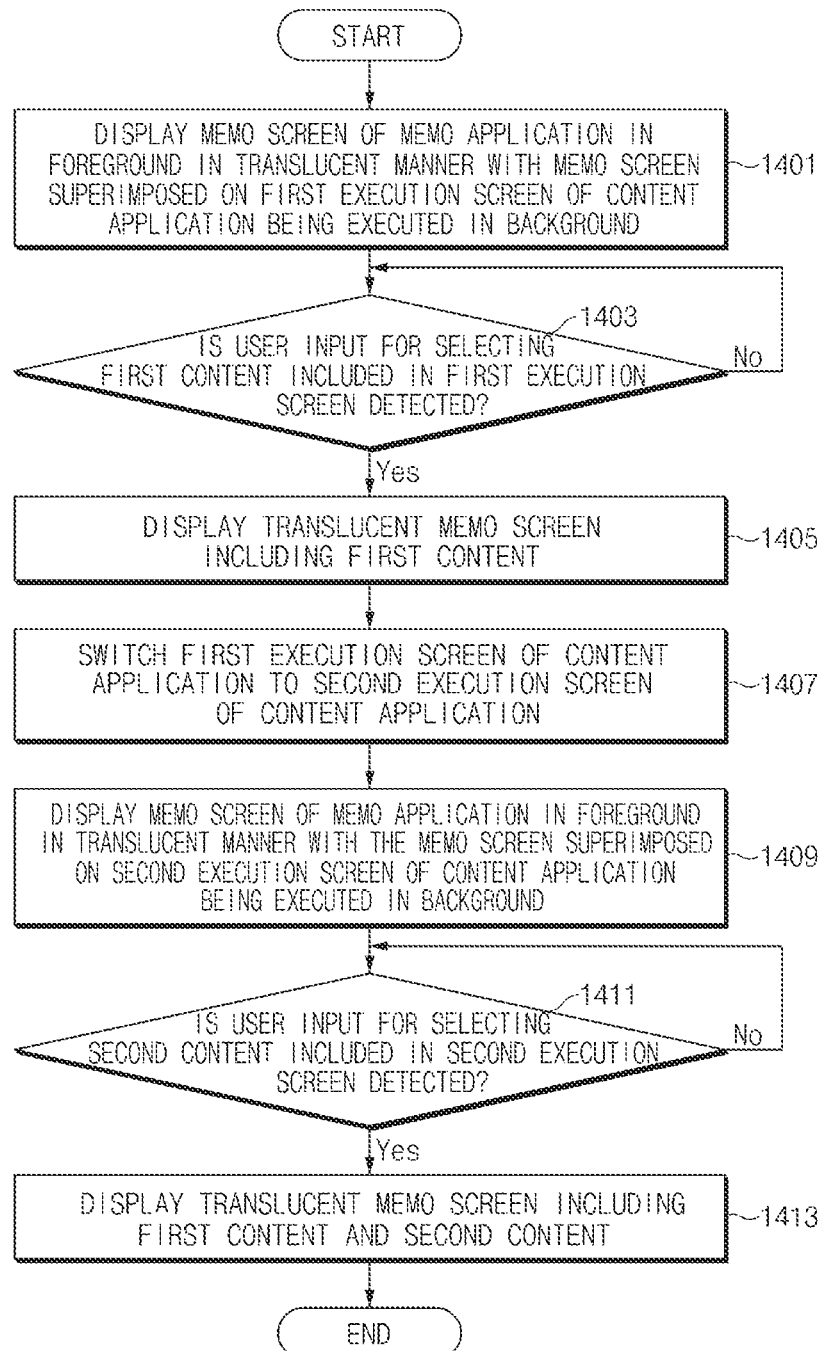
FIG. 14 is a flowchart of an electronic device according to an embodiment of the present disclosure.

FIG. 14 is a flowchart of an electronic device according to an embodiment of the present disclosure.

In operation 1401, the electronic device 100 may display a memo screen of a memo application in a foreground in a translucent manner with the memo screen superimposed on a first execution screen of a content application being executed in a background.

In operation 1403, the electronic device 100 may determine whether a user input for selecting a first content included in the first execution screen is detected.

For example, the user input may be a user input to an area corresponding to the first content on the memo screen.

Alternatively, the user input may be a user input for drawing based on an area corresponding to the first content on the memo screen or drawing so as to include at least a portion of the area.

If the user input is detected (Yes in 1403), in operation 1405, the electronic device 100 may display a translucent memo screen including the first content based on the user input.

According to another embodiment, the electronic device 100 may display a function selection UI including a plurality of function items that are performable on the first content based on the user input for selecting the first content. In this case, the electronic device 100 may display the translucent memo screen including the first content based on a user input for selecting one from among the plurality of function items. The plurality of function items may include, for example, at least one of an item for displaying the first content on the memo screen, an item for temporarily copying the first content to a clipboard, an item function for downloading the first content, or an item for sharing the first content with a third party. In this case, the electronic device 100 may automatically switch a user input target application to the memo application if the item for displaying the first content on the memo screen is selected.

In operation 1407, the electronic device 100 may switch the first execution screen of the content application to a second execution screen of the content application. For example, the electronic device 100 may select a user input target application as an application being executed in the background. In this case, based on a user input on the memo screen, the electronic device 100 may switch the first execution screen to the second execution screen.

In operation 1409, the electronic device 100 may display the memo screen of the memo application in the foreground in a translucent manner with the memo screen superimposed on a second execution screen of the content application being executed in the background.

In operation 1411, the electronic device 100 may determine whether a user input for selecting a second content included in the second execution screen is detected.

If the user input is detected (Yes in 1411), in operation 1413, the electronic device 100 may display a translucent memo screen including the first content and the second content based on the user input.

Then, the electronic device 100 may store the memo screen including the first content and the second content.

In various embodiments, the electronic device 100 may display a screen selection UI for performing switching such that the user input is performed on the content application being executed in the background.

According to various embodiments, the electronic device 100 may acquire information linked to the first content or the second content based on the user input for selecting the first content or the second content. In this case, the electronic device 100 may display a screen based on information linked to the first content or the second content based on the user input for selecting the first content or the second content included in the memo screen.

According to various embodiments, the electronic device 100 may display a transparency adjustment UI by which the transparency of the memo screen is adjustable. In this case, the electronic device 100 may adjust the transparency of the memo screen based on a user input for manipulating the transparency adjustment UI.

Figure 15:
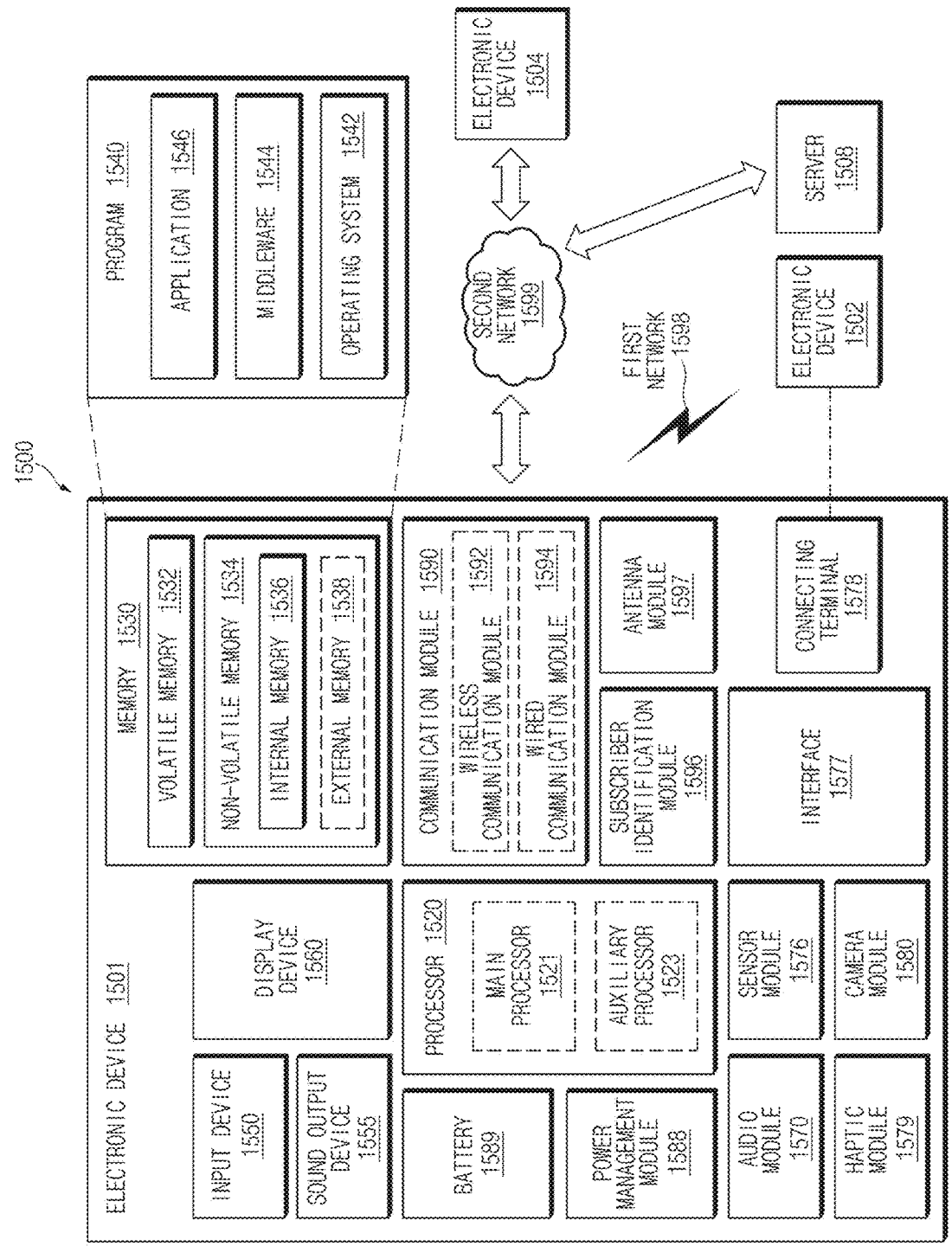
FIG. 15 is a block diagram of an electronic device in a network environment according to an embodiment of the present disclosure.

FIG. 15 is a block diagram illustrating an electronic device 1501 (e.g., electronic device 100 in FIG. 1) in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 (i.e., the processor 120 in FIG. 1) may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 (i.e., the memory 130 in FIG. 1) may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., the memory 130, internal memory 1536 or external memory 1538) that is readable by a machine (e.g., the electronic device 100, the electronic device 1501). For example, a processor (e.g., the processor 120, the processor 1520) of the machine (e.g., the electronic device 100, the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method of controlling an application of an electronic device, the method comprising:
displaying a first execution screen of a content application, the first execution screen comprising first content;
detecting a detachment of an electronic pen from the electronic device;
in response to the detachment, displaying a translucent memo screen of a memo application in a foreground in a translucent manner by superimposing the memo screen on the first execution screen being displayed in a background;
while the memo screen is superimposed on the first execution screen, receiving, from the electronic pen, a first input selecting the first content;
displaying the first content on the translucent memo screen comprising the first content based on the first input;
while the memo screen is superimposed on the first execution screen, receiving a second input by a finger of a user;
in response to the second input, switching, while the memo screen is displayed in the foreground, the first execution screen to a second execution screen of the content application in the background, the second execution screen comprising second content; and
while the memo screen is superimposed on the second execution screen, receiving, from the electronic pen, a third input selecting the second content of the second execution screen; and
displaying the first content and the second content on the translucent memo screen in the foreground.

2. The method of claim 1, wherein the first input for selecting the first content comprised in the first execution screen is a user input to an area corresponding to the first content in the memo screen.

3. The method of claim 1, wherein the first input for selecting the first content comprised in the first execution screen is a user input for drawing based on an area corresponding to the first content or drawing so as to include at least a portion of the area, in the translucent memo screen.

4. The method of claim 1, further comprising displaying a screen selection user interface (UI) for performing switching such that a user input is performed on the content application being executed in the background.

5. The method of claim 1, further comprising acquiring information linked to the first content or the second content, based on the first input or the third input.

6. The method of claim 1, further comprising displaying a screen based on information linked to the first content or the second content based on the first input or the second input.

7. The method of claim 1, further comprising:
displaying a transparency adjustment UI to adjust transparency of the translucent memo screen; and
adjusting the transparency of the translucent memo screen based on a user input for manipulating the transparency adjustment UI.

8. The method of claim 1,
wherein the displaying the first content on the translucent memo screen comprises:
displaying a function selection UI including a plurality of function items that are performable on the first content based on the first input for selecting the first content; and
displaying the translucent memo screen including the first content based on a user input for selecting one from among the plurality of function items,
wherein the plurality of function items include at least one of an item for displaying the first content on the translucent memo screen, an item for temporarily copying the first content to a clipboard, an item for downloading the first content, or an item for sharing the first content with a third party.

9. An electronic device comprising:
an electronic pen detachable from the electronic device;
a touch screen;
at least one processor operatively coupled to the touch screen and the memory, wherein the memory stores at least one instruction configured to, when executed, cause the at least one processor to:
control the touch screen to display a first execution screen of a content application, the first execution screen comprising first content;
detect a detachment of the electronic pen from the electronic device;
in response to the detachment, control the touch screen to display a translucent memo screen of a memo application in a foreground in a translucent manner by superimposing the memo screen on the first execution screen being displayed in a background;

while the memo screen is superimposed on the first execution screen, receive, from the electronic pen, a first input selecting the first content;

control the touch screen to display the first content on the translucent memo screen based on the first input;

while the memo screen is superimposed on the first execution screen, receive a second input by a finger of a user;

in response to the second input, switch, while the memo screen is displayed in the foreground, the first execution screen to a second execution screen of the content application in the background, the second execution screen comprising second content; and while the memo screen is superimposed on the second execution screen, receive, from the electronic pen, a third input selecting the second content of the second execution screen; and control the touch screen to display the first content and the second content on the translucent memo screen in the foreground.

10. The electronic device of claim 9, wherein the first input for selecting the first content comprised in the first execution screen is a user input to an area corresponding to the first content in the memo screen.

11. The electronic device of claim 9, wherein the first input for selecting the first content comprised in the first execution screen is a user input for drawing based on an area corresponding to the first content or drawing so as to include at least a portion of the area, in the memo screen.

12. The electronic device of claim 9, wherein the memory includes at least one instruction configured to, when executed, cause the at least one processor to control the touch screen to display a screen selection UI for performing switching such that a user input is performed on the content application being executed in the background.

\* \* \* \* \*